(12) United States Patent
Kuo

(10) Patent No.: US 8,938,799 B2
(45) Date of Patent: Jan. 20, 2015

(54) SECURITY PROTECTION APPARATUS AND METHOD FOR ENDPOINT COMPUTING SYSTEMS

(75) Inventor: Jen-Wei Kuo, Raleigh, NC (US)

(73) Assignee: Jen-Wei Kuo, Raleigh, NC (US)

( * ) Notice: Subject to any disclaimer, the term of this patent is extended or adjusted under 35 U.S.C. 154(b) by 2389 days.

(21) Appl. No.: 11/597,486

(22) PCT Filed: Jun. 15, 2005

(86) PCT No.: PCT/US2005/021143
§ 371 (c)(1),
(2), (4) Date: Nov. 22, 2006

(87) PCT Pub. No.: WO2006/012014
PCT Pub. Date: Feb. 2, 2006

(65) Prior Publication Data
US 2008/0040790 A1    Feb. 14, 2008

Related U.S. Application Data

(60) Provisional application No. 60/609,612, filed on Sep. 14, 2004.

(51) Int. Cl.
*G06F 12/14* (2006.01)
*H04L 29/06* (2006.01)
*G06F 11/30* (2006.01)
*G06F 21/60* (2013.01)
*G06F 21/56* (2013.01)
*G06F 21/57* (2013.01)
*G06F 21/64* (2013.01)

(52) U.S. Cl.
CPC ............ *G06F 21/604* (2013.01); *G06F 21/564* (2013.01); *G06F 21/577* (2013.01); *G06F 21/56* (2013.01); *G06F 21/64* (2013.01); *H04L 63/1416* (2013.01); *H04L 63/1408* (2013.01); *H04L 63/1441* (2013.01); *G06F 21/57* (2013.01)
USPC ................. 726/22; 726/24; 726/25; 713/165; 713/187; 713/188

(58) Field of Classification Search
CPC ............ H04L 63/1416; H04L 63/1441; H04L 63/1408; G06F 21/56; G06F 21/577; G06F 21/64; G06F 21/57; G06F 21/564
USPC ........... 726/12, 22, 24, 25; 713/165, 187, 188
See application file for complete search history.

(56) References Cited

U.S. PATENT DOCUMENTS 7,058,796 B2 *    6/2006    Lynn et al. ........................ 713/1

* cited by examiner

*Primary Examiner* — Aravind Moorthy

(57) ABSTRACT

A unified security management system and related apparatus and methods for protecting endpoint computing systems and managing, providing, and obtaining security functions is described. Various forms of the system, apparatus and methods may be used for improved security, security provisioning, security management, and security infrastructure.

38 Claims, 15 Drawing Sheets

SECURITY PROTECTION APPARATUS AND METHOD FOR ENDPOINT COMPUTING SYSTEMS

FIELD OF INVENTION

The present invention pertains to a unified security management system and related apparatus and methods for protecting endpoint computing systems capable of communications with a network, including methods for obtaining, operating, and paying for multiple security functions via the system, apparatus and methods.

BACKGROUND

The word "endpoint" will be used here to refer to an "endpoint computing system", for example a computing systems such as a server, a desktop or laptop PC, a PDA or a Smartphone, or a set-top box. The words "endpoint host" or "host" hereafter refer to a primary processor-based computing system supported by any primary operating system. Conventionally, one endpoint often comprises only one host, and in such case, a host is an endpoint, such as a conventional desktop PC, typically having a main processor, possibly one or more coprocessors, and typically running an operating system. Additional subsystems such as various peripherals, network interface devices, modems, etc, with or without their own operating systems, are sometimes connected to such endpoint hosts for a variety of purposes.

Attacks on computer systems have advanced in variety and sophistication. Security functions work to protect endpoints and can generally be categorized into two groups: defense functions and immunization functions.

Defense Functions

The functions in this group are provided to computing systems for defending directly against known or unknown attacks. The functions can be implemented outside or inside an endpoint, or equivalently as network-based or host-based respectively. Various implementations of these functions are well known in the art. Brief descriptions of several defense functions are provided in the following.

Cryptography.

Cryptography is related to confidentiality (for example in using encryption, decryption for privacy), integrity (for example in using a hashing capability to prevent data from being modified during transit), and authenticity (for preventing identity spoofing, for example using digital certificates, and in general determining who is a valid user). Cryptography functions are often incorporated in IPSec (Internet Protocol Security) or SSL (Secure Socket Layer) for virtual private network (VPN) deployments, as is well known. In applications, confidentiality, integrity, and authenticity function procedures may also be used individually to meet specific needs.

Firewalls.

Firewalls are often deployed for example where access control is enforced. Generally, a "perimeter firewall" is deployed as either hardware and/or software at the perimeter of a private network, whereas an "endpoint firewall" is often deployed as software within an endpoint.

Antivirus.

Antivirus functions protect computers from viruses, worms, and trojans. We use virus here as a general term to also represent the other two types of such attack phenomena. Antivirus typically acts primarily by scanning files and comparing them against a database describing signatures of known viruses and against sets of characteristics that tend to reflect behaviors of unknown viruses. Files can be scanned at desired times computer-wide or upon actions such as opening, closing, or loading for execution. In addition, this function may also scan the traversing traffic stream. The traffic streams—such as email, web, file transfers, etc.—can contain viruses that may not exist in the form of a file during attempted attacks. Antivirus functions are well known in the art.

Intrusion Detection System (IDS) and Intrusion Prevention System (IPS).

IDS utilizes a sensor or sensors to detect and alarm intrusion attempts, and the IPS function appropriately prevents the intrusion process from continuing.

Application Firewall.

An application firewall is typically placed as a standalone apparatus before a server to "learn" the protected application. It intercepts and analyzes all incoming and outgoing application-layer traffic, and profiles the content and flow patterns of the application. It may also simultaneously build or modify protection policies. These policies may also be manually adjusted to fit user requirements to provide desired protection behaviors against deviation from normal application behavior.

Application Proxy.

Application proxy functions in general exist in two forms: a forward proxy or a reverse proxy. A reverse proxy coordinates between external clients entering a server, for example a web server within a private network. The role of a reverse proxy is to provide a degree of isolation between the server within a private network and external clients, thus securing the server and enabling appropriate control over the way the application is presented to the clients. A forward proxy, on the other hand, is targeted at offloading real-time traffic between the private network and the Internet, by caching client requests and responses, etc. The forward proxy may also provide isolation between a private network and the Internet. The application proxy thoroughly examines the content of each traffic stream before the traffic stream enters or leaves an application proxy apparatus to determine whether the stream conforms to pre-specified security policy, and whether to allow or deny passage through that apparatus.

Application Filtering.

Application Filtering filters communications associated with applications that typically have been deemed to pose security or productivity threats. Examples of such applications that may facilitate intrusion attempts are Peer-to-Peer file sharing applications such as KaZaa, instant messenger applications such as AOL, and Yahoo! Messengers, and adware and spyware components.

Content Filtering.

Content Filtering is a function that filters for example URLs and SPAMs, to make efficient use of network and human resources and to balance employee work-related Internet use and surfing.

Immunization Functions

This group includes functions for proactively providing computing systems immunity to known or unknown attacks. Deployment of immunization functions can be agent-based, where an agent software module is installed in each endpoint computing system, or agentless, where no agent software is required. Various implementations of these functions are well known in the art. Brief descriptions of several immunization functions are provided in the following.

Patch Management.

Patch management includes processes and tools for managing the deployment and maintenance of software and updates. With the increasing number of patches, service packs, and vulnerability updates from operating system and application vendors, keeping them organized, informed, and up to date is a tedious and ongoing task.

Configuration Management.

Configuration management helps to monitor a computing system's current configuration and record configuration changes. It strengthens security assurance by enforcing configuration conforming to defined policy.

Policy Compliance and Enforcement.

This function typically determines out-of-compliance policy security settings based on standardized policy templates and enforces policies to bring computing systems back into compliance, thereby proactively mitigating system vulnerabilities.

Vulnerability Scanning.

The goal of running a vulnerability scanner is to identify endpoints that are open to known vulnerabilities. Vulnerability scanning functions typically check vulnerabilities in various categories, such as password integrity, file attributes, system configuration, network settings, etc.

Sensitive Data Management.

This function ensures information is used as intended based on policies assigned to users. It manages who can access sensitive information and how the sensitive information can be used, such as print, copy, paste, etc.

Asset Management.

This function is a process used for collecting computing system asset data, such as hardware and software version, license and cost information, how often they are used, trouble records, etc. This data can be used in evaluating security concerns, total cost of ownership, depreciation, licensing, and maintenance.

Password Management.

This function pertains to password and user ID administration for a part or all of the users within an enterprise. It involves the management of password and user ID issuing, changing, renewing, resetting, terminating, automation, etc.

Observations on Deployment in Enterprise Security Solutions

Background observations will be provided now on aspects of deployment of defense functions and immunization functions in enterprise networks.

Conventionally, the deployment of defense functions in enterprise networks can be network-based or host-based, or both. The host-based deployment requires multiple defense function software modules to be installed in each host. The deployment of immunization functions is generally host-based and requires an agent to be installed in each host for each supported immunization function.

Consequently, a deployed security infrastructure consisting of multiple defense and immunization functions may burden the host with multiple defense function software and a number of agents for supporting the corresponding immunization functions. This situation may create software conflict and registry corruption issues in the host and cause end-user productivity loss and unnecessary IT labor cost for testing and validation, which may be exacerbated as the software upgrade/patch incidences for security functions and operating system increase.

It may also create issues such as performance degradation and security vulnerability where security functions may be disabled by malware or human carelessness.

In addition, the aforementioned multiple defense and immunization functions are managed by multiple vendors' management systems. The resulting heterogeneous environment gives rise to duplicated processes and technical and management complexity, leading to high total-cost-of-ownership (TCO) and low return-on-investment (ROI).

FIG. 1A depicts an example of conventional deployment of security infrastructure supporting security management and endpoint protection. In this deployment, blocks 151-155 are examples of defense-function vendors' security management systems, blocks 161-165 are examples of immunization-function vendors' security management systems, and blocks 171-175 are examples of other types of security management systems. The connecting network 121 may be of a private network or public network, or both. The endpoint 102 comprises a network interface card (NIC) 180, a host 181, and other circuitry well known. A collection of defense function and/or immunization agent software modules are downloaded individually from aforementioned various vendors' security management systems and executed in the host 181 along with other non-security programs such as banking, healthcare, insurance, or any other user applications. Execution of security function software modules in host 181 often creates issues such as software conflict, disablement by malware or accident, registry corruption, reduced computer performance, etc. In addition, multiple management systems are often deployed to manage the multiple security functions in an endpoint, creating further operating complexity as the number, type, application, and location of the endpoints increase. Consequently, high operating cost and productivity loss are often major issues for the security infrastructure. To alleviate some of the problems, some defense functions such as cryptography, firewall, and antivirus have been implemented in the NIC 180 hardware and installed with a vendor's own proprietary software or a vendor-dependent software from a third-party vendor, but the benefits are limited, solution cost is high and security service distribution and management remain excessively complex and burdensome.

Observations on Security Services for Residential Internet Users

Background observations will now be provided related to acquiring adequate security services for residential Internet users.

The vast majorities of residential internet users generally do not have sufficient knowledge on computer security, and thus are unlikely to have adequate security protection. Another observation is that the user may experience disruptions that require retries and/or reboots during a security function download, and computer behavior changes after the download. Another observation is that it is generally costly to acquire an adequate number of defense and immunization functions.

Background observations will now be provided related to residential Internet user subscription and billing methods for security services.

One practical aspect of security for the residential user is the need to subscribe to and pay for multiple security services. Billing and user payments are largely handled via separate subscriptions, separate bills, and separate payment processes.

Another observation is that numerous security vendors in the marketplace are available to provide various solutions to counter various security threats. These vendors desire exposure to potential markets. Users desire exposure to information about available security products that may be subscribed to or otherwise obtained. Despite the existence of information sources on the Internet and elsewhere, the necessary processes of identifying desirable vendors and products are inconvenient and often time consuming.

Observations on Password Management

Background observation will now be provided related to password administration.

Password management is integral to overall endpoint security, and is associated with many unmet needs, both for residential users and especially for enterprise endpoint users and IT managers. It is difficult for end users to remember numerous and periodically changing sets of passwords/user IDs, and so end users oftentimes choose not to conform to security policy or practice and instead, for example, write passwords/user IDs information down on a post-on or into a computer file. For end users who do conform to good security practice, may forget their passwords and/or user IDs, and they must typically call a helpdesk and request a password reset in order to re-enter applications, or they must via other means obtain a new password/user ID pair. This process reduces end user productivity and adds an extra load and cost to already-burdened helpdesk.

SUMMARY OF THE INVENTION

The present invention pertains to a unified security management system, which in various embodiments may comprise various component systems and methods, including for example a management server and associated database system, and a hardware and software "security subsystem", herein called a Security Utility Blade (SUB). A SUB in various embodiments may run its own operating system with a dedicated processor, and in various embodiments a SUB may reside in a managed endpoint or in close association with an endpoint, internally or externally connected with an endpoint as well as to a network.

The unified security management system may be used in various embodiments to form a unified management zone (UMZ) for managed endpoints. At the edge of the zone, controls from various security management systems from any combination of vendors may be terminated, interpreted, and translated into a set of predetermined formats for communicating with managed endpoints within the UMZ without direct access to the endpoints by vendors' security management systems. Any new software may be stored in a repository database before deployment. As such, the security functions from various vendors' security management systems can be added to or removed from the zone without the vendors' security management systems having direct access to the endpoints in the zone.

The abovementioned SUB, a subsystem to an endpoint may be used to support a unified security management system, and may comprise for example a security function software module repository and execution unit and an immunization functions related unified agent. Related methods for integrated security, will also be described, including methods for password management using a SUB, for obtaining multiple defense function software modules via a unified security management system, and methods for unified subscription, billing, and payment handling related to obtaining those software modules.

OVERVIEW OF THE INVENTION

A unified security management system may be used to form a unified management zone for managed endpoints, the system comprising typically a management server and associated database system, and a SUB subsystem in each member endpoint in the UMZ. With the provisioning of the management server, security management systems from any combination of vendors can be added to or removed from the UMZ on-demand without involving any direct access from vendors' security management systems to the managed endpoints in the UMZ. Thus operations within this zone may be made more homogeneous, automated, and accurate. Little or no extra IT labor is required for validating and diagnosing, in the case of some embodiments and applications. In addition, the UMZ approach may also enable standardized procedures for deployment of security functions to the endpoints, lowering IT operations costs, among numerous other potential advantages of various particular embodiments and applications.

A unified security management system may also be configured in some embodiments to enable methods that implement network access control and identity management.

A unified security management system may also be configured in some embodiments to enable mechanisms that unify and automate security subscriptions, and enable single-bill consolidated billing methods.

A unified security management system may also be configured in some embodiments to enable mechanisms that allow Internet service providers and IT service providers to offer managed security services for enterprise and residential end users.

The management server, on one side, may connect in some embodiments to a management server operator's console, multiple vendors' security management systems, and if any, other security management systems via either proprietary or standard communication channels, or both. A unified interface converter, which may be for example a software module at the front-end of the management server or a standalone hardware and software system, may be provided to convert communication formats into a unified format known to the management server. Various vendors' security management systems may thus be able to connect centrally to a management server and the administrator of the management server may change security functions and/or vendors on demand. The other side of the management server may communicate with a SUB in each of the managed endpoints via either proprietary or standard channels.

The management server may function in some embodiments as an action enforcer by using a proxy. A proxy may terminate and authenticate requests from one or multiple security vendors management systems, then interpret and translate them into a predetermined format and send them via a connecting network to a target SUB for desired actions. The responses from the target SUB traverse back to the senders of the requests via the management server.

The management server may also function as a data collector collecting endpoint information emanating from SUBs of the managed endpoints and as a software distribution coordinator coordinating software downloads.

The management of management servers can be structured in hierarchical manner comprising such entities as head-end management server or tail-end management server.

We now turn to the SUB subsystem. The SUB functions in some embodiments as an open platform for repository of defense function software modules and optionally, immunization agent software modules from any participating vendors and such embodiments also provide resources for execution of the modules. A SUB may in some embodiments comprise a dedicated embedded unified agent for supporting all immunization functions and optionally, one or more agent functions to support defense function modules. The SUB may be placed at the network interface point, wireline or wireless, in various form factors, in various types of endpoints. Different types of endpoints may typically use different subsets of available defense and immunization functions. The SUB may include processing resources that may be allocated or partitioned in various ways, for example as circuitry in the form of a single chip, or multiple chips, and peripheral circuitry. The circuitry may include one or more processors. This circuitry may also incorporate a general-purpose CPU. Some embodiments of the SUB may incorporate special circuitry in the form of a Data Stream Inspection & Treatment (DSI&T), optionally in chip form. These and other optional circuits may be designed for appropriate power consumption and throughput for use with various types of endpoints, such as desktop PCs, laptops, servers, and wireless devices. In various embodiments, a SUB runs an operating system (OS), separate from any host operating system, and which may be a security OS, or security-centric OS, referred to herein as a SUBOS. Such a SUBOS may be qualified under extensive security tests and certified by various government or independent testing labs to be also described as a "security hardened" OS.

One or more database systems may be attached to the management server as a repository for endpoint information, activity log, software patch updates, etc., for management, auditing, forensic purposes, etc.

Password management may be configured as a SUB-enabled service in some embodiments, allowing an end-user to securely store and retrieve password and user ID pairs locally at the SUB of the end-user's endpoint. Through implementation via a SUB, previously provided services may be provided far more efficiently, such that, for example, in an enterprise environment helpdesk calls for password/user ID assistance can be largely avoided. The SUB may also support in some embodiments various other log-on capabilities, such as Single Sign-On (SSO).

DETAILED DESCRIPTION

A unified security management system and several apparatus and associated methods for providing endpoint computing system security are described. In the following description, for purposes of explanation, numerous details are set forth in order to provide a thorough understanding of the claimed subject matter. However, it will be apparent to one skilled in the art that these specific details are not required in order to practice the claimed subject matter.

Figure 1A:
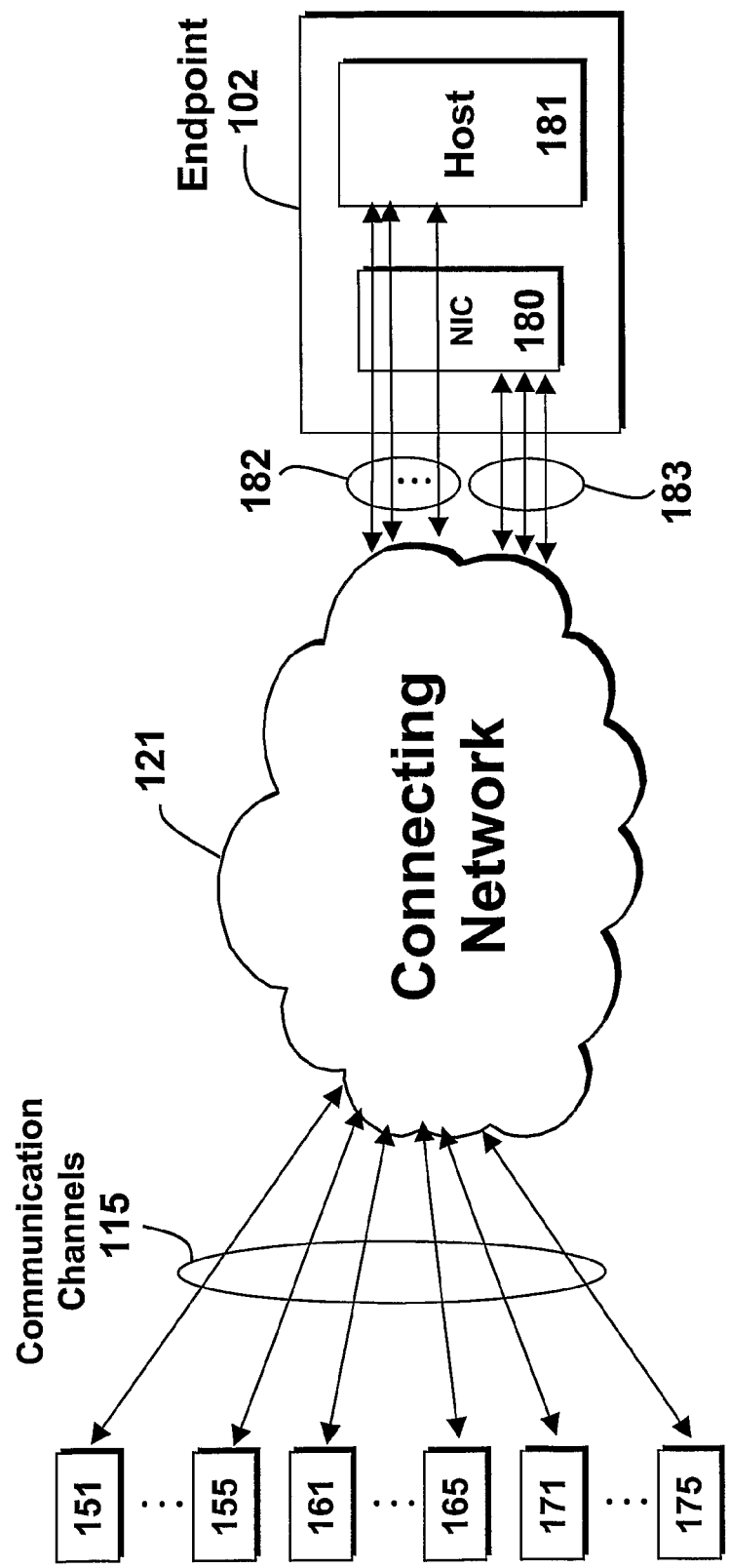
FIG. 1A illustrates an example of conventional security service delivery infrastructure
Figure 1B:
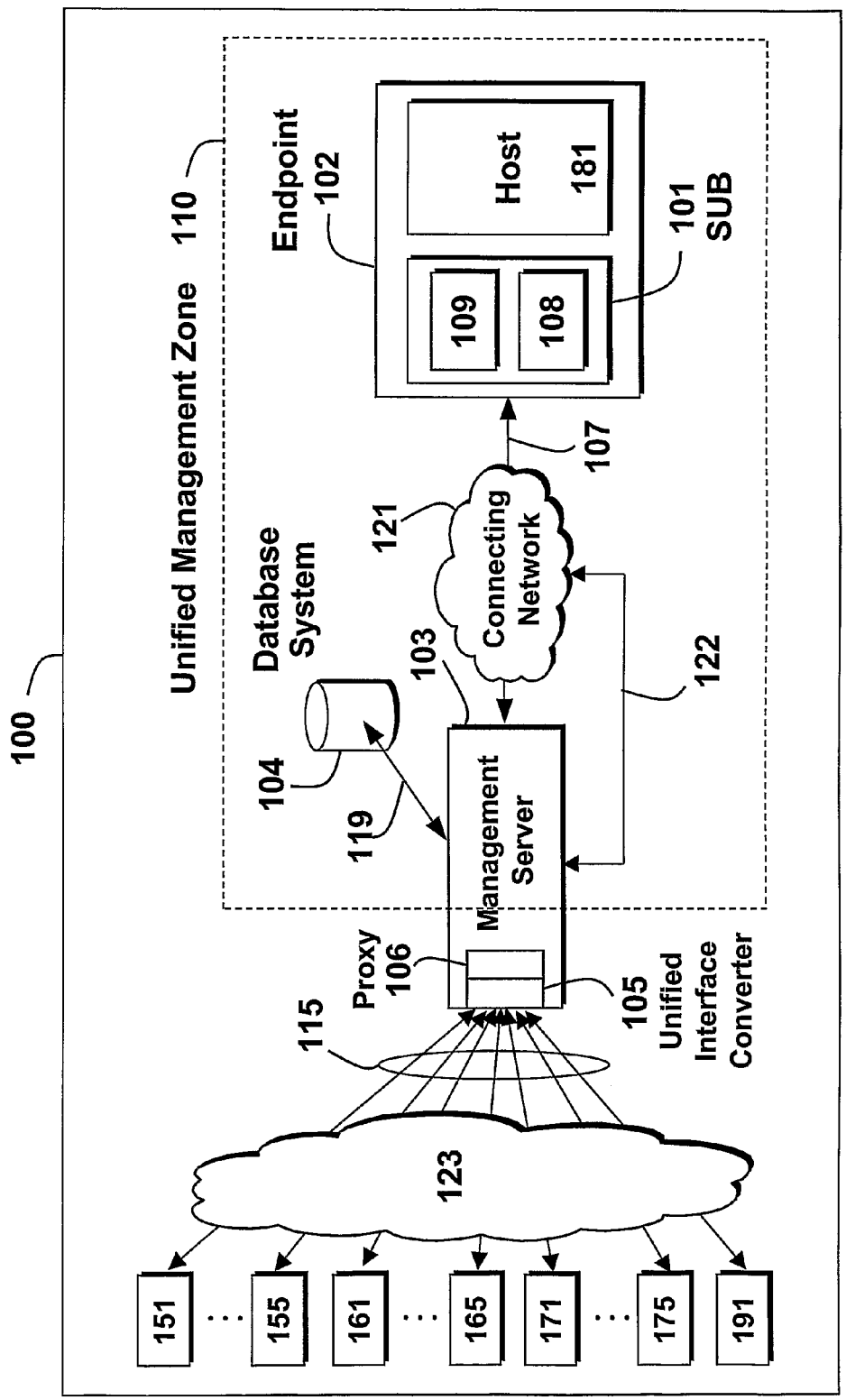
FIG. 1B illustrates an embodiment of a unified security management system

FIG. 1B depicts one embodiment of a Unified Security Management System 100 for endpoint protection that comprises SUB 101, a hardware and software subsystem that may run on its own operating system and here resides in each endpoint 102 of a managed set of at least one endpoint, a Management Server 103 and associated database system 104, a Unified Interface Converter 105 that maybe a software module at the front-end of the Management Server 103 or an attached hardware and software system for converting the communication channels 115, which may have same or different protocols and data formats among those individual channels, coming from various security vendors management systems connecting directly or over connecting network 123 to Unified Interface Converter 105 into a unified format known to the Management Server 103. As such the security vendors' security management systems 151-155, 161-165, and 171-175 depicted here are able to connect centrally to Management Server 103. The provisioning, monitoring, and other control functions for the Management Server 103 may be performed through a Management Server Operator's Console 191, which may be connected directly or over connecting network 123 to Unified Interface Converter 105. Connecting network 121 and 123 may be same or different networks.

The Unified Security Management System 100 as embodied in FIG. 1B may be used to form a Unified Management Zone 110 for the managed endpoints, within which the security operations are more homogeneous, automated and accurate. For example, within such a zone little or no extra IT labor may be required for validating and troubleshooting certain security functionalities. For example, Unified Interface Converter 105, may allow an administrator of Management Server 103 to change security functions and vendors on demand without involving direct access from vendors' security management systems to the managed endpoints. A description of example embodiments of functional elements in this zone 110 is given below.

Unified Management Zone

The SUB 101 may function in some embodiments as an open platform on which some or all of host-based defense function software modules and optionally immunization agent software modules from various vendors can be downloaded and executed in a Repository and Execution Unit 108. The software modules may be downloaded from defense function vendors' security management systems and may then be stored in database system 104 by way of Management Server 103. Those modules may then be downloaded into a SUB 101 based on the target endpoint's security needs provisioned in the Management Server 103. In some cases, the modules may be downloaded from various vendors' security management systems directly to SUB 101.

Numerous other alternative embodiments are envisioned, both functionally and in terms of forms of specific means for providing those functions. For example, SUB 101 may provide multiple immunization functions without defense function capabilities, or any combination of immunization and defense functions may be provided for in various embodiments.

A Unified Agent 109 may be natively embedded in some embodiments of SUB 101 to support immunization agent functions and optionally to support defense functions. The supported functions of Unified Agent 109 may include functions such as ones to provide information to the host, get information from the host, monitor host activities, upload and download coordination between SUB 101 and Management Server 103 over a channel 107, and others related to security functions. Unified Agent 109 may be managed by a Management Server 103.

Management Server 103 may be used as a managing entity of a unified security management system. Its functions may include but are not limited to the following. It may function as a data collector that collects endpoint information such as configuration, event log, etc., from SUB 101, for example in a predefined time interval, and stores the information into database 104. It may also function as an action enforcer where Management Server 103 may use a proxy 106 function to terminate and authenticate requests from various management systems 151-155, 161-165, 171-175, and 191 for applications such as vulnerability scan, password reset, or policy enforcement, etc. Then proxy 106 may interpret or translate the requests into a set of predetermined formats used only within zone 110 and send the requests to the target SUB 101. Conversely, responses from target SUB 101 may traverse back to Management Server 103 and be passed, under control of Management Server 103 to management systems originating the requests.

Database system 104 may be used as a repository for endpoint information, auditing and forensic data, and defense function software modules, patches and updates through the coordination of Management Server 103 via a secure channel 119. As such, management systems 151-155, 161-165, 171-175, and 191 are in effect able to fetch information from an endpoint or deposit data to an endpoint via Database System 104 without directly accessing the endpoint. Database System 104 may serve one or multiple zones in various embodiments envisioned.

A control and feedback mechanism between Management Server 103 and connecting network 121 may be provided over connection 122 to support functions such that security decisions of Management Server 103 can be disseminated into connecting network 121 for further security-related actions, such as access control, etc. The connecting network 121 may be, for example, a private network or public network, or both.

Figure 2A:
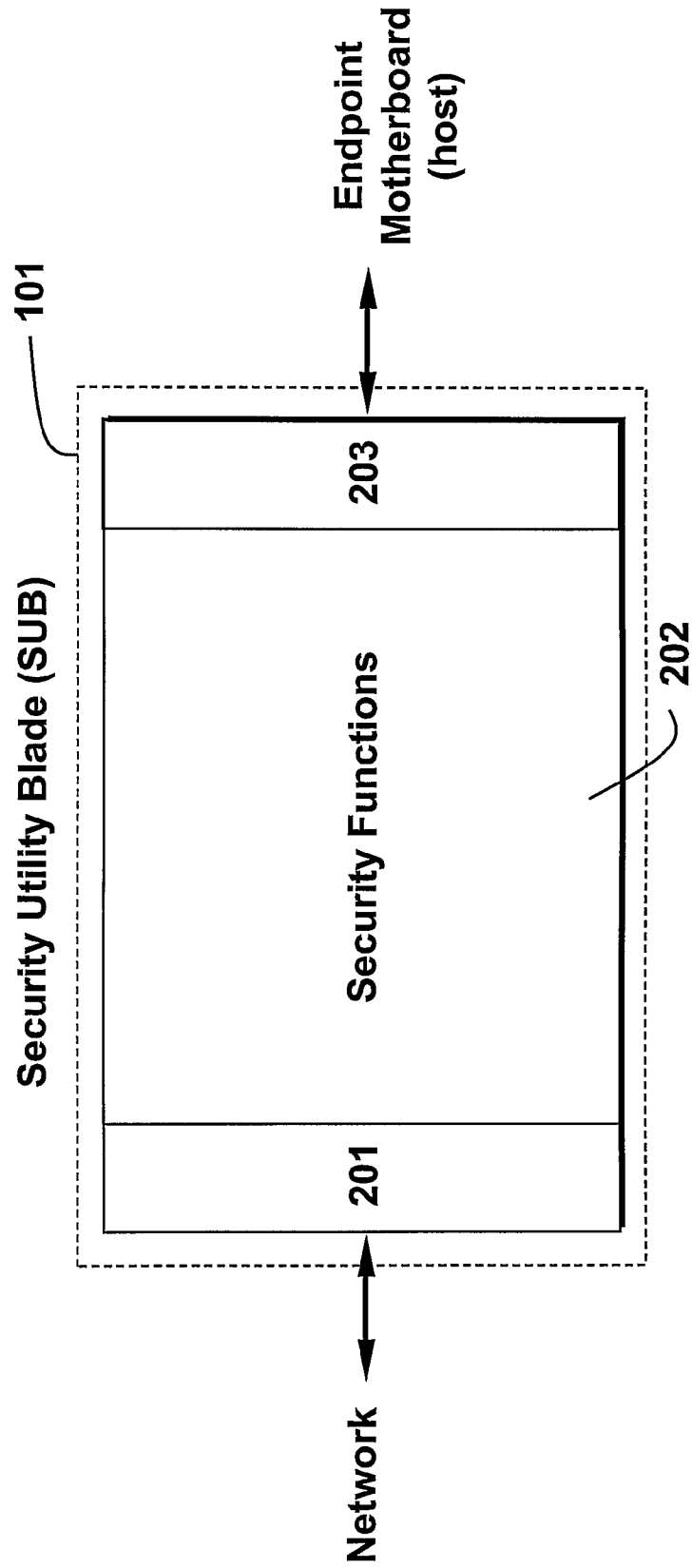
FIG. 2A illustrates an embodiment of a security utility blade (SUB).

FIG. 2A depicts the positioning relationship of a SUB 101 apparatus with respect to a network and an endpoint having a motherboard, where conventionally a host resides. A representative embodiment of a SUB 101 apparatus is described with reference to FIG. 2B. In the figure, a SUB 101 is provided at the endpoint network interface for providing integrated security protection such as defense and immunization functions as described. Other placements, forms, and degrees of integration with the endpoint are also envisioned. One such embodiment is depicted in FIG. 2C, showing a SUB 221, without network interface circuitry, in module form and mounted on or completely embedded in an endpoint motherboard.

Figure 2B:
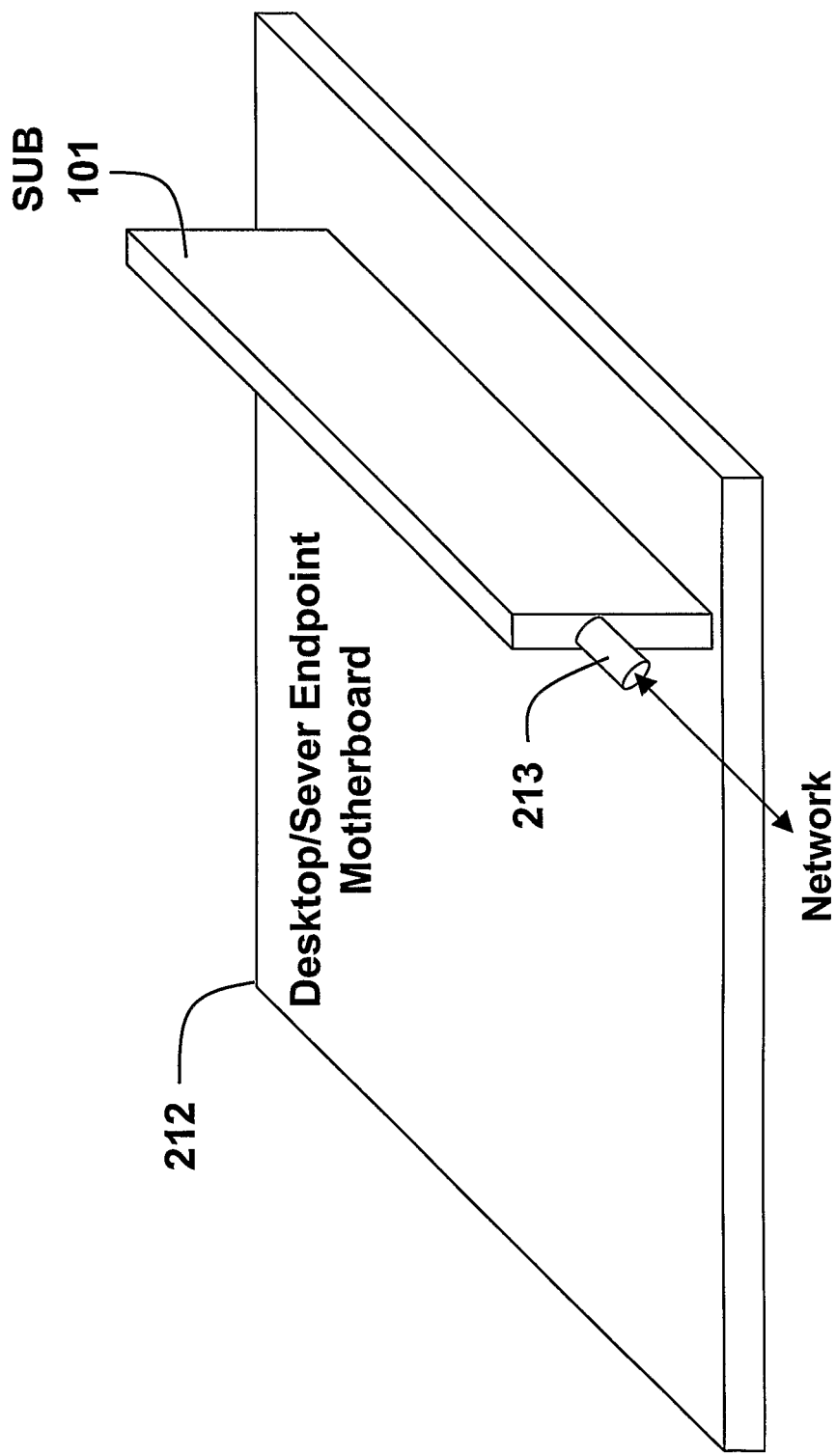
FIG. 2B illustrates an embodiment of a SUB as installed in a slot for attachment to a desktop/server endpoint's motherboard.

In an embodiment such as represented in FIG. 2B, a SUB 101 is installed in a slot of motherboard 212 of an endpoint, such as in this example a server or desktop PC. The SUB 101 may comprise at least a Repository and Execution Unit 108 and a Unified Agent 109. The Repository and Execution Unit 108 may perform at least the repository and execution tasks for security function software modules, which may be obtained for example via a unified security management system, as will be described. The Unified Agent 109 may perform tasks at least to support immunization agent functions. The Repository and Execution Unit 108 and a Unified Agent 109 may comprise any appropriate combination of and partitioning of computational resources capable of carrying out and supporting their described functions, including resources such as processor and program logic as well as other forms of circuitry and additional processing support. They may be partially separate physically in some embodiments, or realized partially using a common set of physical resources.

The SUB 101 is located between the network and the host in order to be in position to intercept all traffic to and from the host and provide security isolation between host and the network. By acting in appropriate ways according to its defense function components it may protect the host against attacks coming from the network side, whether from external (public) or internal (private) networks, and it may also in some embodiments prevent the network from receiving attacks or other undesired traffic emanating from the host.

Figure 2C:
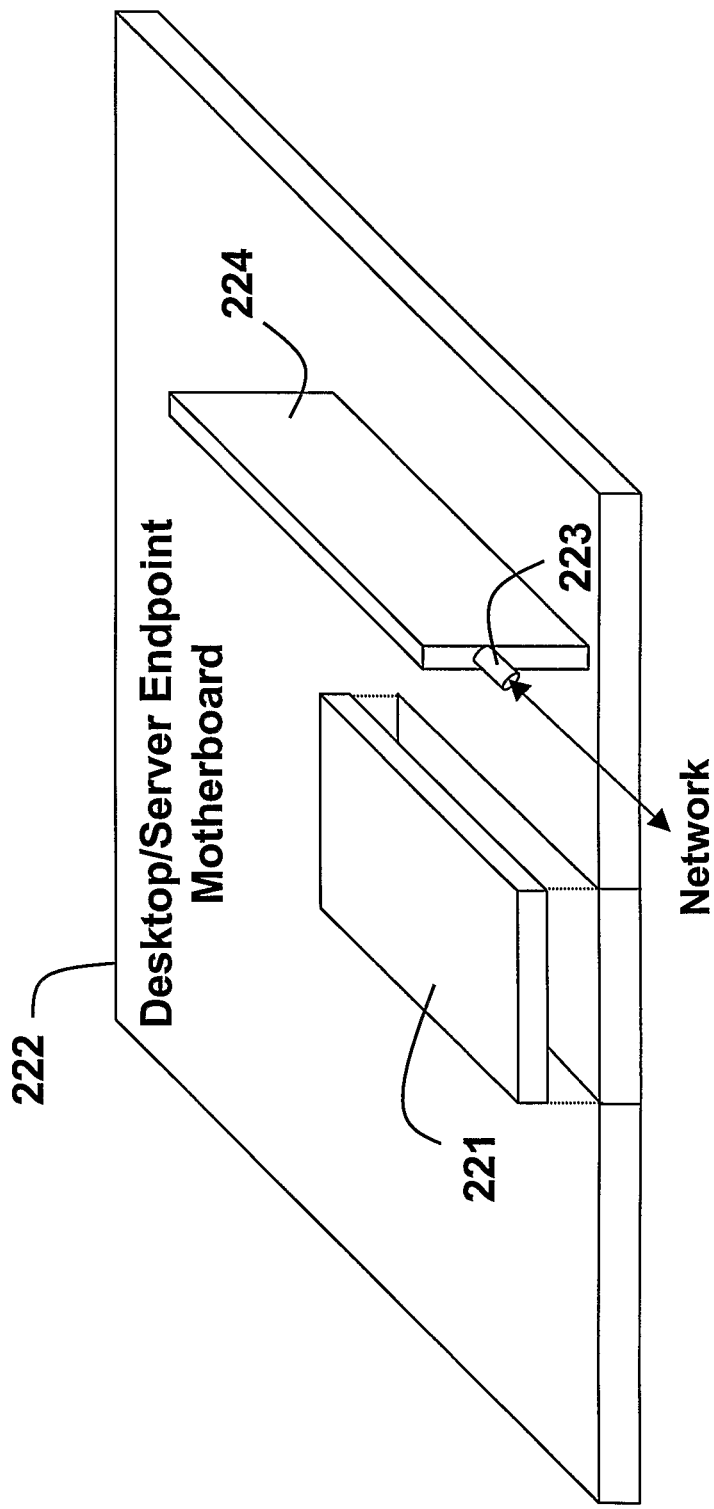
FIG. 2C illustrates an embodiment of a SUB installed or embedded in a desktop/server endpoint's motherboard.

In embodiments such as the one depicted in FIG. 2C, the SUB function may be implemented in for example, chip or chipset form, or printed circuit module mounted on or embedded in a motherboard, with Network Interface Circuitry 224 provided separately within the endpoint or, as shown in FIG. 2B, integrated within a SUB 101.

Figure 2D:
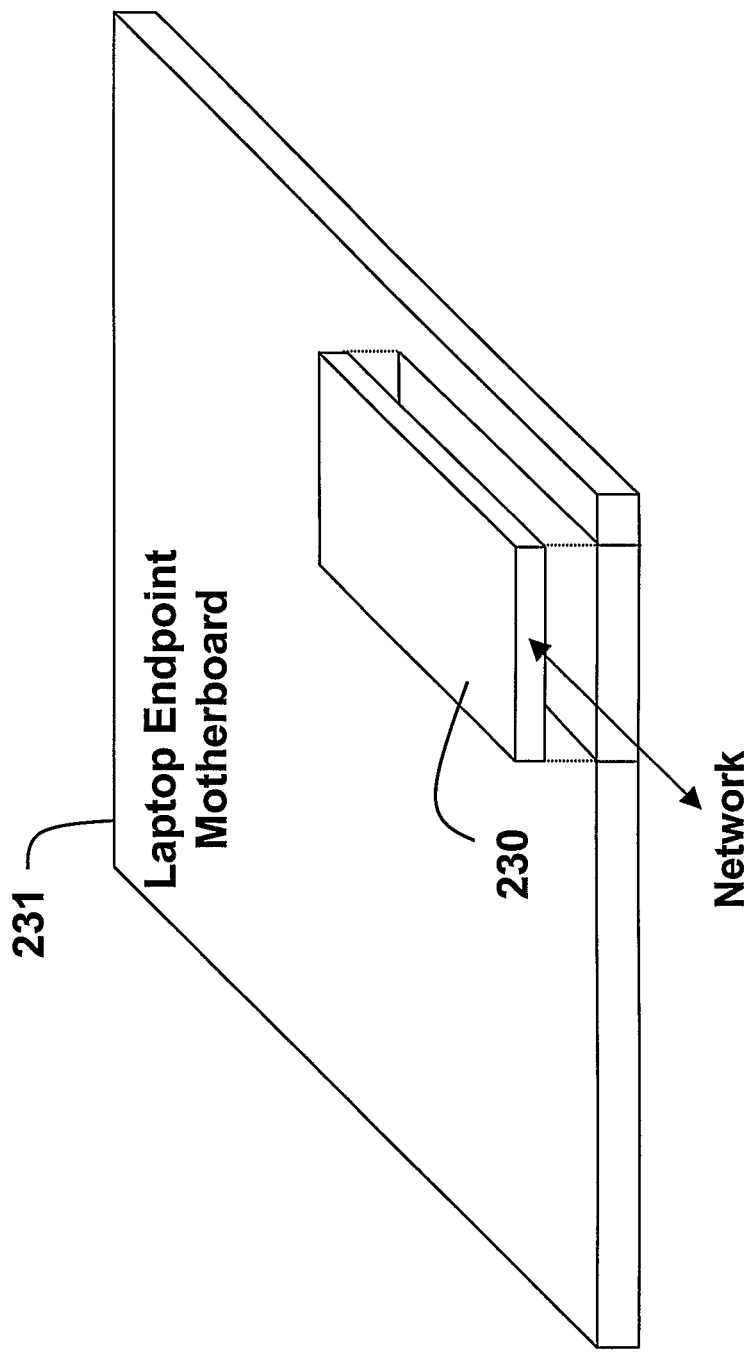
FIG. 2D illustrates an embodiment of a SUB installed in a laptop slot or mounted to a laptop endpoints motherboard.

Another example embodiment is depicted in FIG. 2D, where, for supporting a laptop PC or intelligent device such as PDA (Personal Data Assistant) or Smartphone, SUB 230 may be inserted as a plug-in or slide-in or build-in unit in appropriate standard or non-standard form factors.

The functionality of various embodiments in different form factors, as depicted in the example drawings showing SUB 101, SUB 221, and SUB 230, need not differ simply due to the use of one of the possible form factors. Of course, embodiments in some form factors may tend to differ in ways well known in the art as appropriate according to host characteristics. For example, a laptop or other battery powered or mobile unit may appropriately incorporate power saving design options, features supporting wireless communications, or other such variations appropriate to, for example, the host computer's low power or mobile computing environment. To reduce duplication in the following functional descriptions, functional descriptions of SUB 101 embodiments should be understood to apply as well to embodiments in any of the variety of appropriate form factors.

Figure 3:
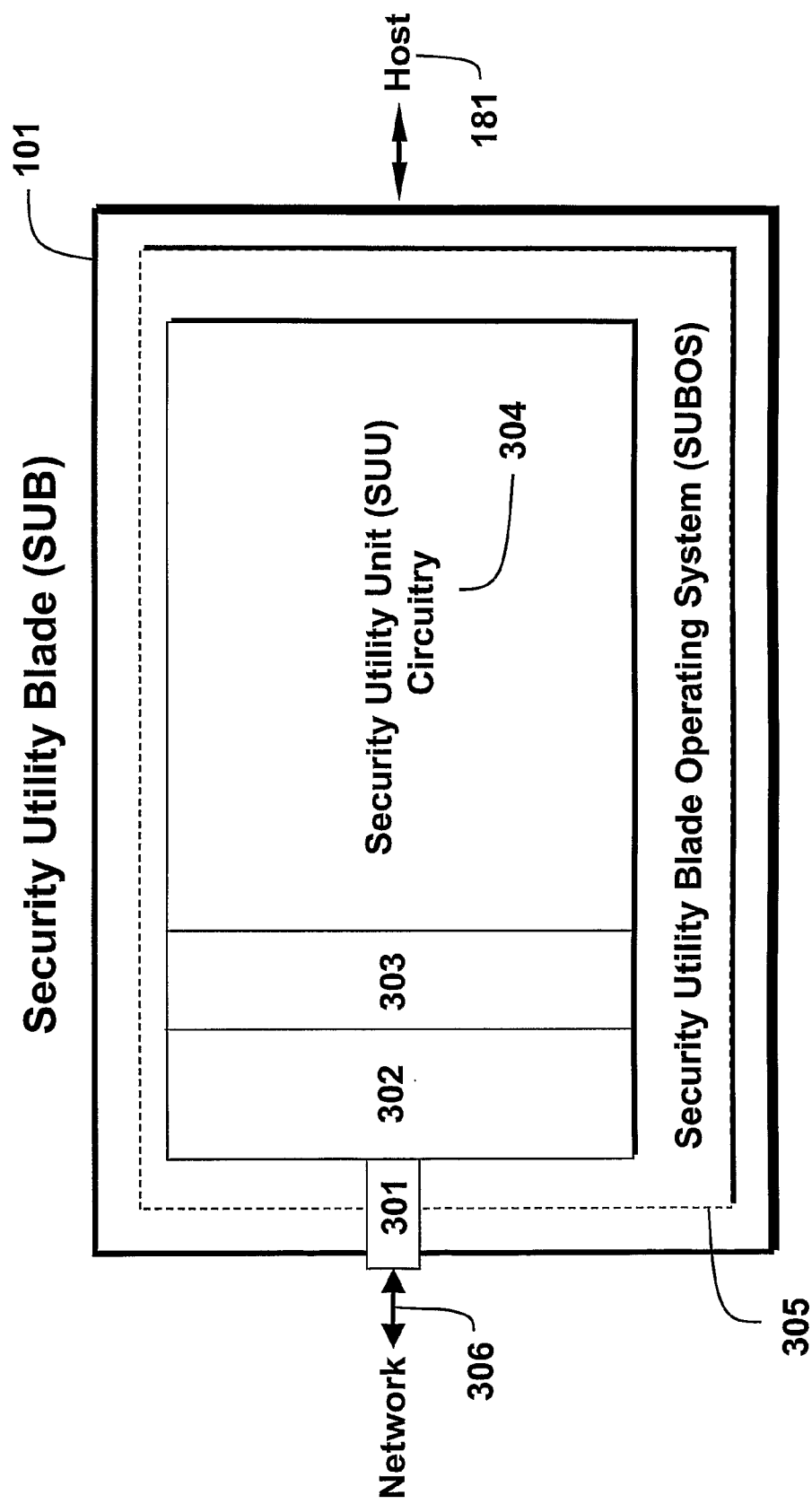
FIG. 3 illustrates an embodiment of a SUB illustrating major functional elements.

A more detailed exemplary embodiment of a SUB 101 will now be described. A SUB 101 as depicted in FIG. 3 comprises a Network Interface Part 301, Network Interface Circuitry 302, Inter-circuitry Interface (ICI) 303, Security Utility Unit (SUU) 304, and an operating system, for example a Security Utility Blade Operating System (SUBOS) 305.

The Network Interface Part 301 may be a hardware interface, such as a connector in the case of wired network connections, or an antenna for wireless connection, located to form a connection between the Network Interface Circuitry 302 and a transmission medium 306, such as twisted-pair wire, coaxial cable, fiber optic cable, or wireless link. When in the form of a connector, it may be either electronic or optical. The Network Interface Circuitry 302 performs functions similar to those of the well-known Network Interface Card (NIC) in a computer system, such that the computer can be in communications with a network. The Network Interface Circuitry 302 may include either wireline or wireless_network interface functions. As with a typical NIC, the Network Interface Part 301 and the Network Interface Circuitry 302, and in some cases other elements of the SUB 101 may be designed to work with a particular type of network, such as Ethernet or ATM (Asynchronous Transfer Mode).

The ICI 303 is an interface between the Network Interface Circuitry 302 and Security Utility Unit (SUU) 304. The ICI 303 may incorporate specific circuitry to handle proprietary or standard-based interconnecting functions.

The SUU 304 may comprise a set of circuitry including one or more processors to perform the processing typically required to support an extensive set of security functions. A more detailed description of an exemplary embodiment of an SUU 304 is provided below. The high performance nature of the SUU 304 may be significantly enhanced by pairing with an appropriate embodiment of a real time operating system. The operating system may comprise a standard operating system of types commonly available, or may instead comprise an OS specifically appropriate for security applications, such as a Security Utility Blade Operating System (SUBOS) 305.

Embodiment of a Security Utility Unit (SUU)

Figure 4:
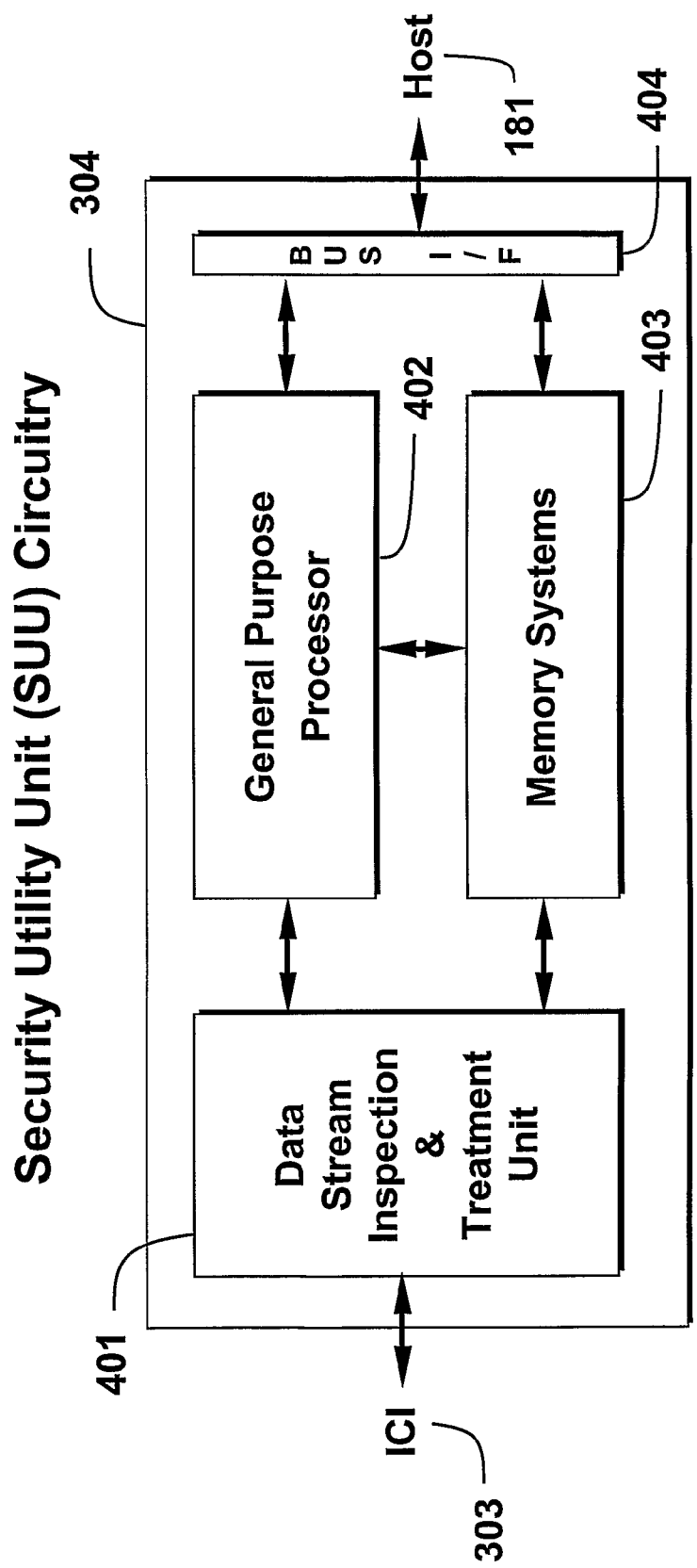
FIG. 4 illustrates an embodiment of a security utility unit (SUU).

In a more detailed representative embodiment as shown in FIG. 4, the SUU 304 may be comprised of several major functional blocks, including a Data Stream Inspection and Treatment unit 401, a General Purpose Processor 402, multiple memory systems 403, and a bus interface 404. Other partitionings of computing resources in various forms of hardware and software may also be used in various embodiments.

Data Stream Inspection and Treatment (DSI&T)

Data Stream Inspection and Treatment (DSI&T) unit 401 generally carries out tasks related to real time examination of the incoming and outgoing traffic and treatment based on security policy. The DSI&T unit 401 may include an embedded inspection engine to accelerate the performance of content inspection. Such unit may be called upon to perform functions including IP defragmentation and TCP reassembly, TCP/IP protocol decode, application protocol decode, and application payload inspections, and other operations to support defense function processes incorporated in the SUB 101 system.

General Purpose Processor

General Purpose Processor 402, along with DSI&T unit 401, may be used to provide the required computing power to support an extensive set of security functions. The Memory Systems 403, such as ROM, SRAM and DRAM, provide required storage. The bus interface 404 to local bus may allow the SUU 304 to connect to the host 181. The resources of SUB 101 may not be accessible by host 181 so as to form isolation in the direction from host 181 to SUB 101. The local bus may for example comprise a standard PCI (Peripheral Component Interconnect) bus, based on a local bus standard developed by Intel Corporation, or other variations of such interconnect systems.

SUU Functional Architecture

Figure 5A:
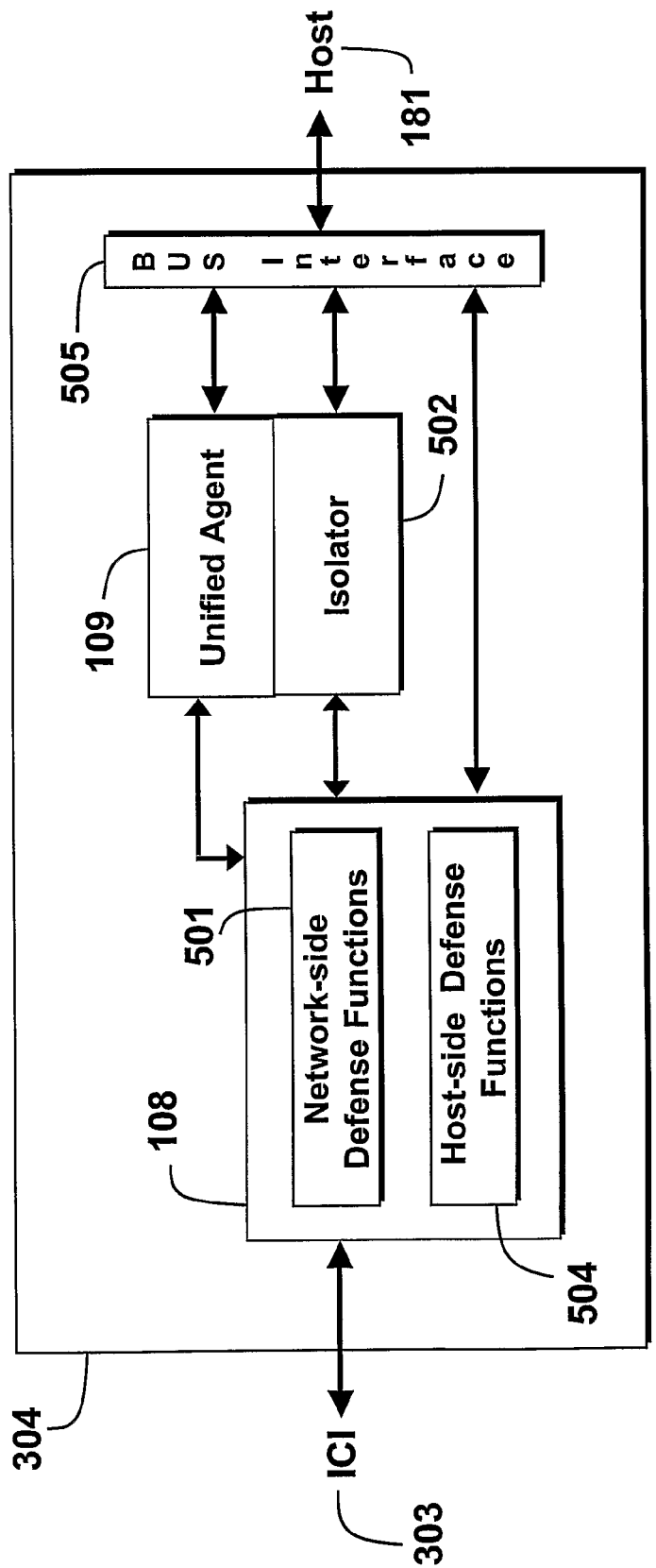
FIG. 5A illustrates a representative SUU functional architecture.

FIG. 5A depicts an example of an embodiment for SUU 304, in terms of overall traffic flow. Incoming (reverse process for outgoing) traffic is fed through ICI 303 into block 501 of Repository and Execution Unit 108 for network-side defense functions processing, such as endpoint firewall, antivirus, intrusion detection and prevention, filtering, etc. After block 501, the traffic is then typically terminated at isolator 502, which works similarly to the well-known "proxy". If the incoming data stream is endpoint security-related management traffic, isolator 502 may typically route it to Unified Agent 109 for further processing. Block 504, also in Repository and Execution Unit 108, may include certain host-side defense functions, such as antivirus and intrusion detection and prevention, which can be used to scrutinize infected files and monitor system activity anomalies and data integrity within the host. In Repository and Execution Unit 108, depending on various deployment, each defense function may run its own embedded agent, or alternatively, it may use the support from the Unified Agent 109.

Figure 5B:
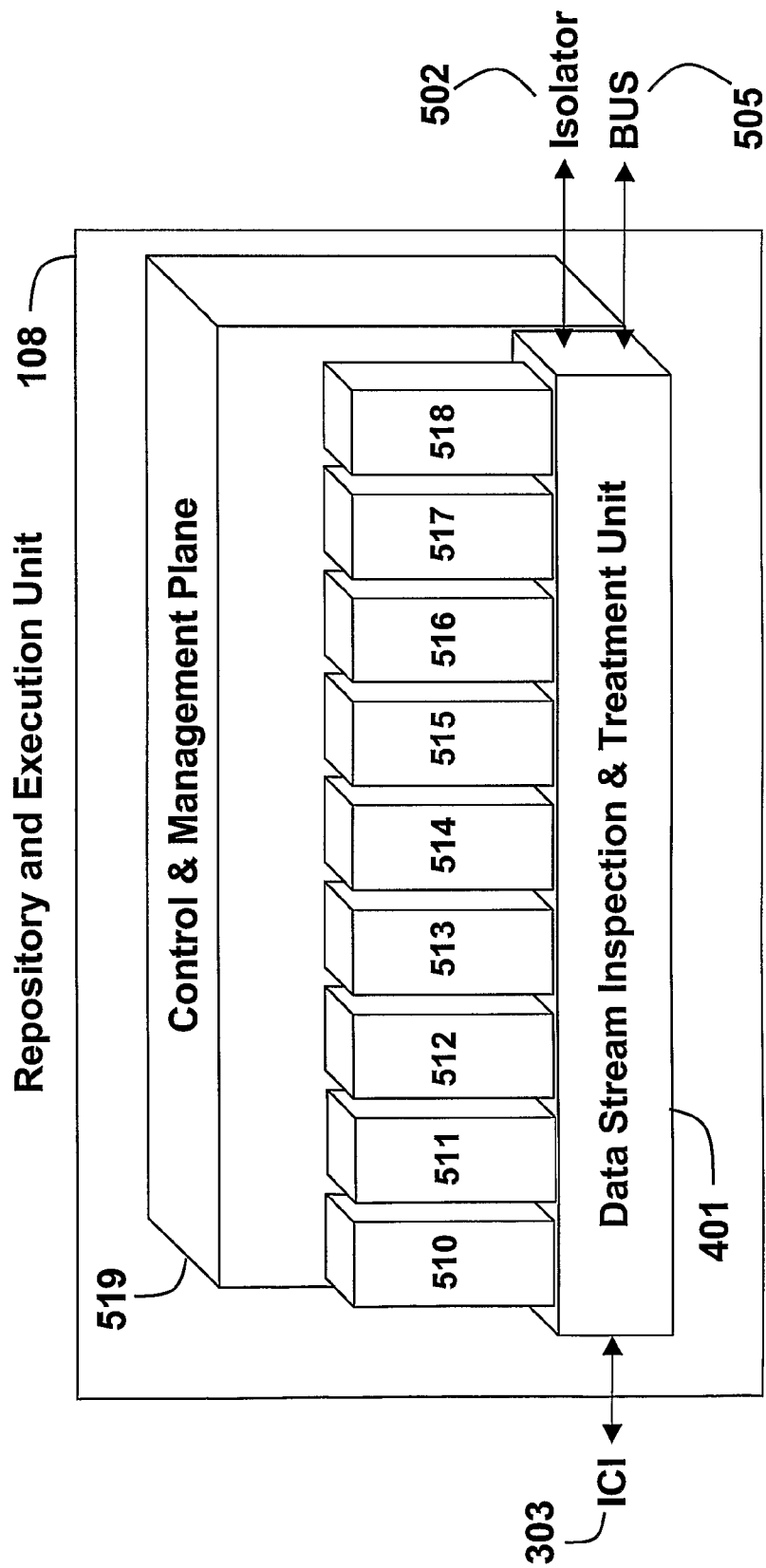
FIG. 5B illustrates an embodiment of a Repository and Execution Unit in terms of function blocks.

FIG. 5B depicts an example embodiment of the Repository and Execution Unit 108 in an SUU 304 in terms of defense functions, such as Cryptography 510, Endpoint Firewall 511, Antivirus 512, IDS/IPS 513, Anti-Malware 514, Application Firewall 515, Application Proxy 516, Application Filtering 517, Content Filtering 518, etc.

Figure 5C:
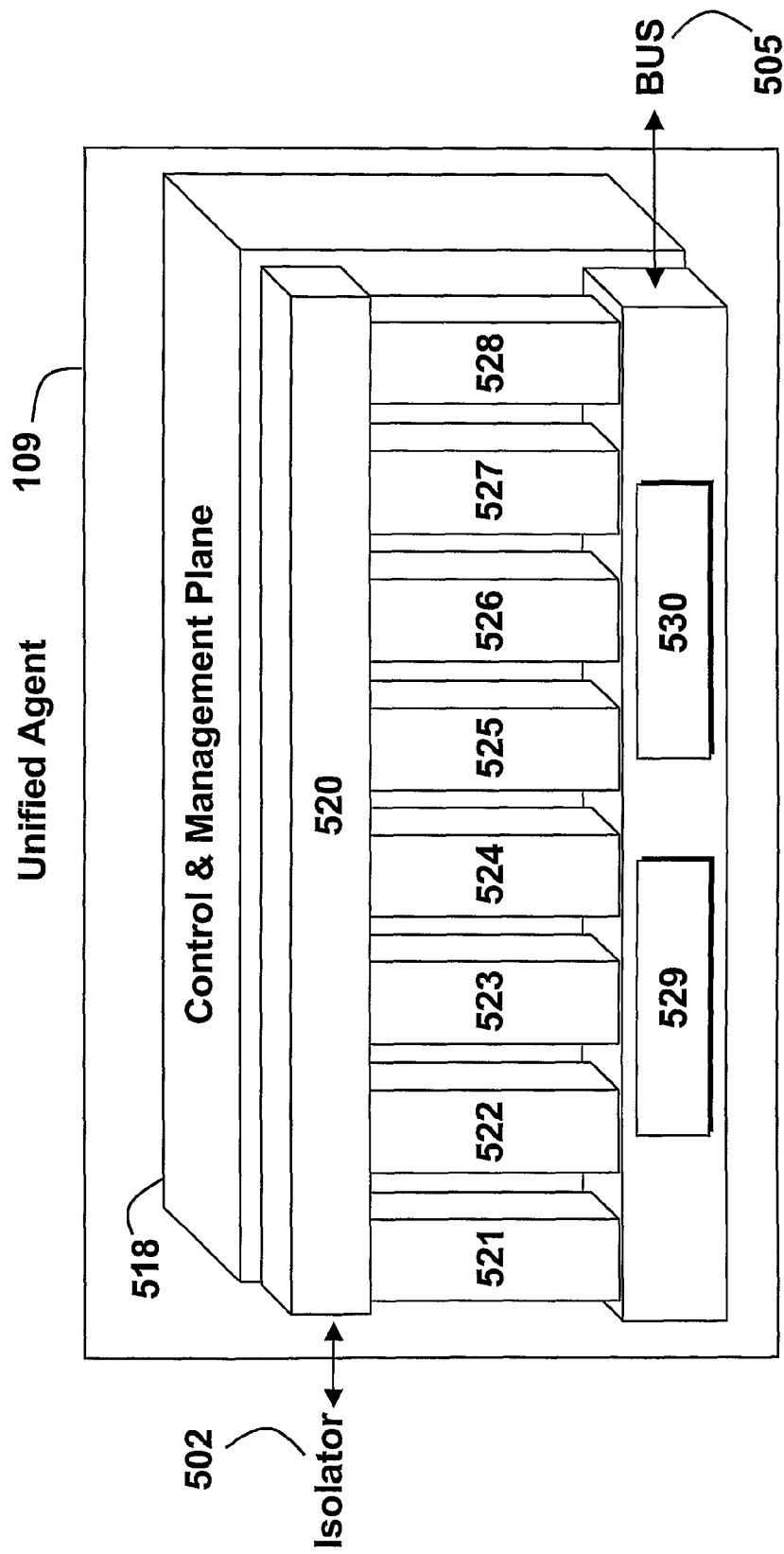
FIG. 5C illustrates an embodiment of a Unified Agent in terms of function blocks.

FIG. 5C depicts an example embodiment in terms of Unified Agent 109 functions in an SUU 304. Traffic routed from isolator 502 enters traffic distributor 520 of Unified Agent 109, where, for example, if the traffic is a query from Unified Agent Manager 601 in FIG. 6 for current software versions in the host, it is switched to a target function for proper actions. The traffic distributor 520 may then invoke Patch Management agent function 521, which uses Data Collector 529 for obtaining requested information. If Unified Agent Manager 601 initiated a new patch delivery, the Unified Agent 109 may then use Action Enforcer 530 to coordinate with the host for download. Unified Agent 109 collects data automatically at a pre-scheduled time frame or manually as requested by the Unified Agent Manager 601 and may then store the collected data into an on-board database. Communications between Unified Agent Manager 601 and Unified Agent 109 are typically on secured channels established through required encryption and authentication processes. Descriptions of exemplary embodiments of Unified Agent 109 functions are given below in the section on Unified Agent 109 function examples.

Unified Agent Function Examples

In the embodiment as depicted in FIG. 5C, Traffic Distributor 520, Data Collector 529, Action Enforcer 530, Control and Management Plane 519, etc. are common elements in Unified Agent 109 for supporting the sub-agents 521 through 527 for the corresponding immunization functions. Some or all of the sub-agents 521 through 527 may be used depending on the degree of immunization for which the endpoint is configured. The Unified Agent 109 also may support the required agent function to perform subscription and billing management 528.

Patch Management

Patch Management sub-agent 521 may periodically or otherwise communicate with the endpoint host through Data Collector 529 for software version and patch signature information and may store it in an on-board memory or database. When polled by Unified Agent Manager 601, sub-agent 521 relays host's software and patch information to the Unified Agent Manager 601, which may take any of several actions, such as deciding whether a new patch is needed. When Unified Agent Manager 601 initiates a new patch delivery, sub-agent 521 may use Action Enforcer 530 to coordinate with the host for a download. SUU 304 provides an isolated, controlled, and security hardened environment for patch management sub-agent 521 to handle patch management procedures automatically, or manually if desired. The patch management sub-agent 521 may comprise a software module residing and executing in Unified Agent 109.

Configuration Management

Under configuration policy for an endpoint, configuration management sub-agent 522 may use Data Collector 529 to periodically examine the host's configuration database, for example a registry, and coordinate with Unified Agent Manager 601 to record, report, or alarm a change, in one embodiment. Through Action Enforcer 530, the sub-agent 522 may correct any misconfiguration that, for example, may give write access improperly to system directories, too much read access or sharing of sensitive data with weak or no passwords, etc. In addition, sub-agent 522 also may help to turn off, through Action Enforcer 530, unneeded services provided in the host operating system, such as telnet, remote registry, etc. In addition, sub-agent 522 also may include other configuration-related capabilities such as registry maintenance, etc. The SUU 304 provides an isolated, controlled, and security hardened environment for configuration management sub-agent 522 to handle configuration management procedures automatically or manually if desired. The configuration management sub-agent 522 may comprise a software module residing and executing in Unified Agent 109.

Policy Compliance and Enforcement

Policy compliance and enforcement sub-agent 523 may be used to check with an endpoint host through Data Collector 529 for configuration and security profile data and store it in an on-board memory or database. When polled, for example by Unified Agent Manager 601, the sub-agent 523 may respond with appropriate host profile information to Unified Agent Manager 601, which may take any of several appropriate actions, such as generate alarms or report an out of compliance event. If an out of compliance event occurred, the Unified Agent Manager 601 may then coordinate, automatically or via manual assistance, with sub-agent 523 to download an update or take other proper measures through Action Enforcer 530. The SUU 304 provides an isolated, controlled, and security hardened environment for policy compliance and enforcement sub-agent 523 to handle policy compliance and enforcement procedures automatically, or manually if desired. The policy compliance and enforcement sub-agent 523 may comprise a software module residing and executing in Unified Agent 109.

Vulnerability Scanning

Vulnerability Scanning sub-agent 524 may hold an on-board database that stores required vulnerability checks in various categories, such as password integrity, file attributes, system configuration, network settings, etc, which may be updated by Unified Agent Manager 601. Thus when Unified Agent Manager 601 initiates a request for vulnerability scan on one or multiple categories, sub-agent 524 will feed packet streams into the host through Data Collector 529 and collect the response from the host. The sub-agent 524 may then send response information back to Unified Agent Manager 601, where the response information may be compared with a database of known vulnerabilities to identify vulnerabilities at the host. Unified Agent Manager 601 may initiate a fix to the identified vulnerabilities via sub-agent 524 using Action Enforcer 530. The SUU 304 provides an isolated, controlled, and security hardened environment for Vulnerability Scanning sub-agent 524 to handle vulnerability scanning procedures automatically, or manually if desired. The Vulnerability Scanning sub-agent 524 may comprise a software module residing and executing in Unified Agent 109.

Asset Management

The information collected via Data Collector 529 for supporting the aforementioned immunization functions may also be used for supporting Asset Management to improve the utilization of endpoint hardware and software assets to minimize total cost of ownership and maximize return-on-investment. The Asset Management sub-agent 525 may be used to check endpoint assets, such as hardware and software version, license and cost information, how often they are used, trouble records, etc., and feed the results to Unified Agent Manager 601 for further use. The SUU 304 provides an isolated, controlled, and security hardened environment for Asset Management sub-agent 525 to handle asset management procedures automatically, or manually if desired. The Asset Management sub-agent 525 may comprise a software module residing and executing in Unified Agent 109.

Sensitive Data Management

The Sensitive Data Management sub-agent 526 may utilize a policy database, which may be on-board, to store the clearance of an authenticated end-user furnished by a system administrator via Unified Agent Manager 601. The sub-agent 526 may ensure information is used as intended through access and usage control. Based on a policy database, sub-agent 526 may control which sensitive information in external file servers can be accessed by the end-user, and how the accessible data is to be used, such as via screen capture, printing, being operated on by valid applications, copying to a portable media drive, etc. The SUU 304 provides an isolated, controlled, and security hardened environment for Sensitive Data Management sub-agent 526 to handle sensitive data management procedures automatically, or manually if desired. The Sensitive Data Management sub-agent 526 may comprise a software module residing and executing in Unified Agent 109.

Password Management

Various embodiments of the SUB 101 may be used in providing methods of Password Management (PM). In carrying out some of the PM methods, the SUB 101 may, for example, examine two-way traffic and in a secure manner collect and store PM-related data in memory. The following is one example a PM method using an embodiment of a SUB 101 at an endpoint.

Password recovery may be enabled using embodiments of SUB 101 based on the provided isolated, controlled, and security hardened environment and ability to examine two-way traffic and store data in memory. The following is an example.

During an enrollment process when a user is first time registering to servers or applications, Password Management sub-agent 527 in SUU 304 may examine the two-way data stream via Data Collector 529. The Data Collector 529 may then capture and store securely each user's encrypted single or multiple "Password and ID" pairs and "Challenge-Response" user profile in an on-board database. In the meantime, similar "Password and ID" and "Challenge-Response" information is saved in the target server's management system for authentication use.

When a user forgets his/her password/ID, the following or similar procedures may be carried out to resolve the situation:

For a manual approach, the user for example calls a helpdesk to make a "password/ID recovery" request. Then the helpdesk authenticates the user with his/her "Challenge-Response" user profile. Once authenticated, the helpdesk may use Unified Agent Manager 601 to access user's sub-agent 527 to reveal desired Password/ID pair(s), through Action Enforcer 530, on the user's monitor. The displayed information will then be erased after a pre-defined time. No resetting of password/ID is required because the original information is securely held and supplied to the user by the SUB 101.

For an automatic approach, the user may interact and authenticate with sub-agent 527 through Action Enforcer 530 biometrically or with "Challenge-Response" user profile answers. Once authenticated, sub-agent 527 reveals the desired Password/ID set on the user's monitor. The displayed information will then be erased after a pre-defined time. No process of resetting password/ID via helpdesk is required. This approach may or may not involve Unified Agent Manager 601.

Once the user is signed on with the host, the sub-agent 527 may conduct sign-on procedures on behalf of the user for desired servers and applications. This procedure is called Single Sign-On and well known in the art.

The Unified Agent Manager 601 may disable the host sign-on process by sending a command to sub-agent 527 to avoid unwanted sign-on due to Human Resource or other issues that may cause a potential internal attack hazard, thus giving time for IT personnel to reconfigure systems.

Another example PM method using an embodiment of a SUB 101 at an endpoint allows users to store their single or multiple "Password and ID" pairs and "Challenge-Response" user profiles directly into a sub-agent 527. To retrieve the Password/ID, a user may interact and authenticate with sub-agent 527 through Action Enforcer 530 biometrically or with "Challenge-Response" user profile answers. Once authenticated, sub-agent 527 may be used to reveal the desired Password/ID set on the user's monitor. The displayed information may then be erased after a pre-defined time.

SUU 304 may provide an isolated, controlled, and security hardened environment for Password Management sub-agent 527 to handle password management procedures automatically, or manually if desired. The Password Management sub-agent 527 may comprise a software module residing and executing in Unified Agent 109.

Control and Management Plane

The control and management plane 519, a resident entity in a SUB 101, that may be used to carry out SUB 101 level management functionality, such as one or more of configuration, resource allocation, status monitoring, alarm reporting, event logging, performance indication, error control, etc.

The control and management plane 519 also may carry out management tasks over Repository and Execution Unit 108 and Unified Agent 109.

The Management Server 103 may work in concert with control and management plane 519 of one or more SUB 101 units to form a Unified Management Zone 110.

The control and management plane 519 also may carry out communications with Management Server 103 for SUB 101 enabling, disabling, and status reporting, etc.

Management Server

Management Server 103 may function as a centralized management entity of the Unified Security Management System 100, as shown in FIG. 1. Management Server 103 may comprise software that may be loaded into a server system for managing deployed SUB 101 units in a network.

The Management Server 103, on one side, may connect to Management Server Operator's Console 191, multiple vendors' security management systems 151-155 and 161-165, and if any, other security management systems 171-175 via proprietary, or standard, or both, communication channels 115. A Unified Interface Converter 105, which may comprise a software module at the front-end of the Management Server 103 or a standalone hardware and software system attached to Management Server 103, may be used to convert communication channels 105 into a unified format known to Management Server 103. As such, various vendors' security management systems may be able to connect centrally to Management Server 103 and the administrator of the Management Server 103 may be able to change security functions and/or vendors on demand. The other side of the Management Server 103 may communicate with a SUB 101 in each managed endpoint via either proprietary or standard channel 107.

After any process of Unified Interface Converter 105, Management Server 103 may function as an action enforcer by using a Proxy 106, which may terminate and authenticate requests from one or multiple security vendors management systems and then interpret and translate them into a predetermined format, then send them via a Connecting Network 121 to a target SUB 101 for desired actions. Responses from target SUB 101 may traverse back to senders of the requests via Management Server 103, in reversed process.

Management Server 103 may also function as a data collector, collecting endpoint information emanating from each SUB 101 of the managed endpoints and as a software distribution coordinator coordinating software downloads.

The management of Management Servers may be structured in hierarchical manner comprising such entities as a head-end management server or a tail-end management server.

One or more sets of Database System 104 may be attached to a Management Server 103 as repository for endpoint information, activity log, software patch updates, etc., for management, auditing, forensic purposes, etc. One Database System 104 may support multiple Unified Management Zones 110.

Control and feedback mechanisms between Management Server 103 and Connecting Network 121 may be provided over connection 122 to support functions such that security decisions of Management Server 103 can be disseminated into Connecting Network 121 for further security-related actions, such as access control, etc. Connecting Network 121 can be of private network or public network, or both.

Figure 6:
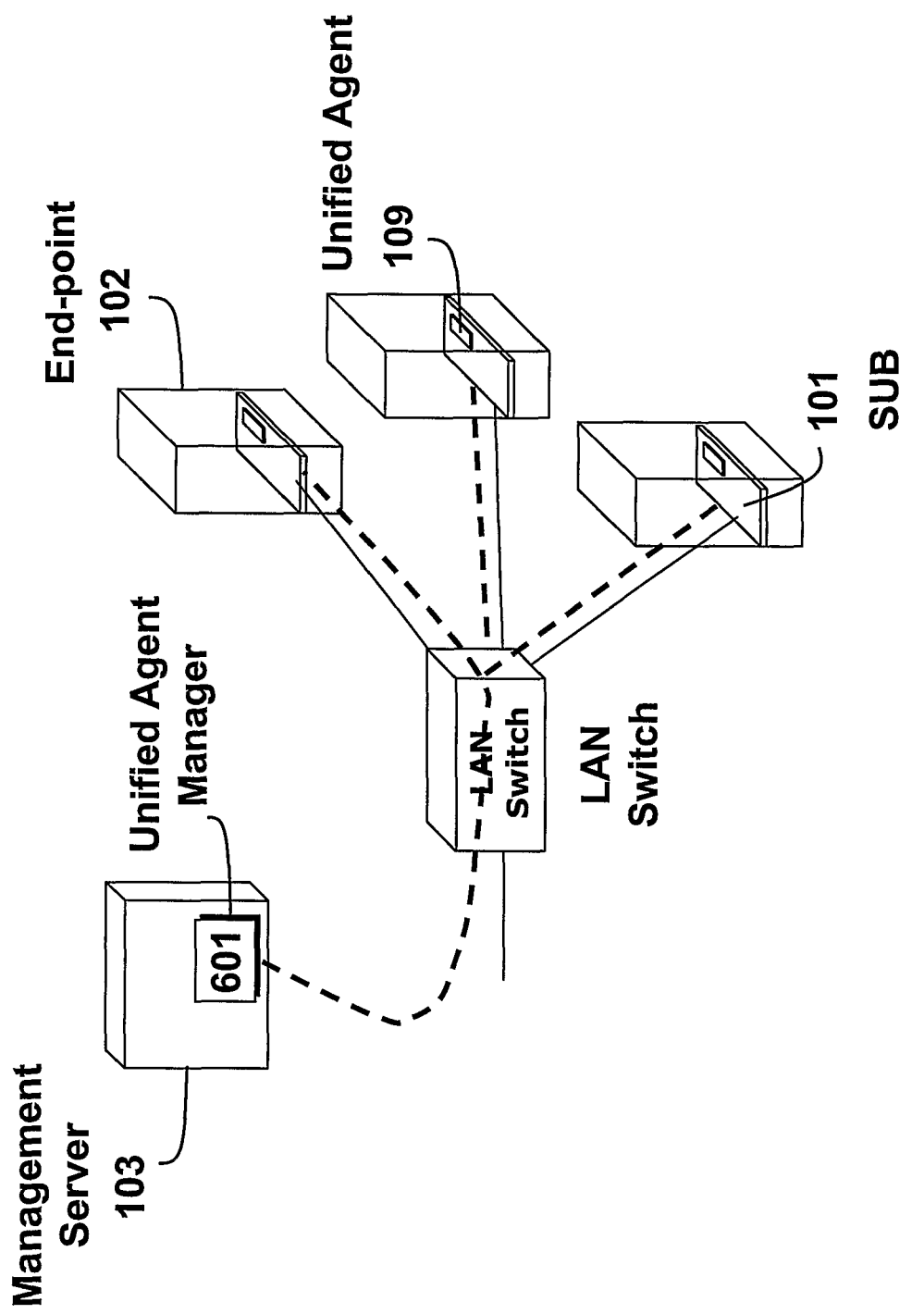
FIG. 6 is a schematic diagram illustrating a Unified Agent Manager according to an embodiment of the invention.

As shown in FIG. 6, Management Server 103 may comprise other functions, such as Unified Agent Manager 601, and other basic management functions, such as alarm analysis and reporting, file and download management, etc.

Security Utility Blade Operating System (SUBOS)

Some embodiments may incorporate an operating system specifically designed for a SUB 101. SUBOS 305 may be a real time operating system purposely built for security purposes, and specifically for use in an apparatus such as SUB 101 in order to support an extensive set of defense and immunization functions and provide the performance required for such processing at wirespeed data rates, for example in a range up to 1 Gbps or higher. Some or all of the security function vendors' software modules may be able to run on SUBOS by conforming to the SUBOS message format and interpretation rules, etc. with the use of SUBOS' application programming interfaces (API).

Unified Subscription and Billing Management

Figure 7A:
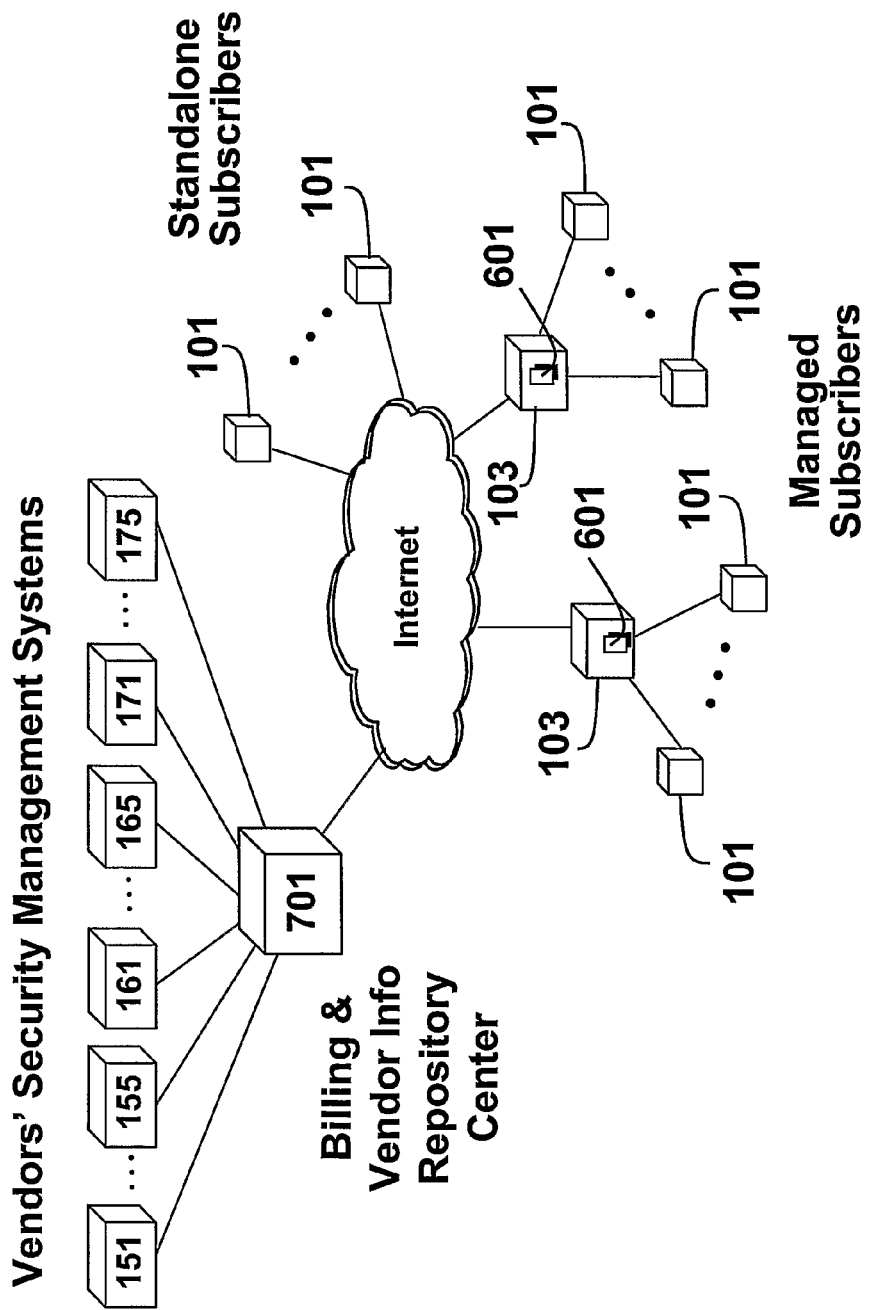
FIG. 7A is a schematic diagram of a network environment for illustrating a method according to an embodiment of the invention.

As shown in FIG. 7A, Unified Agent Manager 601 may also carry out communications with entities in a Billing and Vendor Info Repository Center 701 for subscription and billing management. In various embodiments, the Billing and Vendor Info Repository Center 701 functions may be integrated with and reside in Management Server 103.

SUB 101 in various embodiments may allow desired software modules, such as the described defense functions 511-518 in FIG. 5B, to be loaded and run on the apparatus, and target software modules may be subscribed manually or automatically. Typically a module may be downloaded from a module vendor over a connection. In order to achieve unified subscription and billing, a centralized repository and business operation site 701 such as shown in FIG. 7A may be used.

Site 701 may store vendor product and support information, comprising for example lists of vendors and products in various security product categories. The creation and use of such a repository may enable participating vendors to have a desired level of exposure to large sets of end users. Similarly, it may provide end users access to large sets of defense and immunization function software vendors and helpful information about vendor products, services, and pricing, facilitating objectives of both end users and vendors, as desired.

Figure 7B:
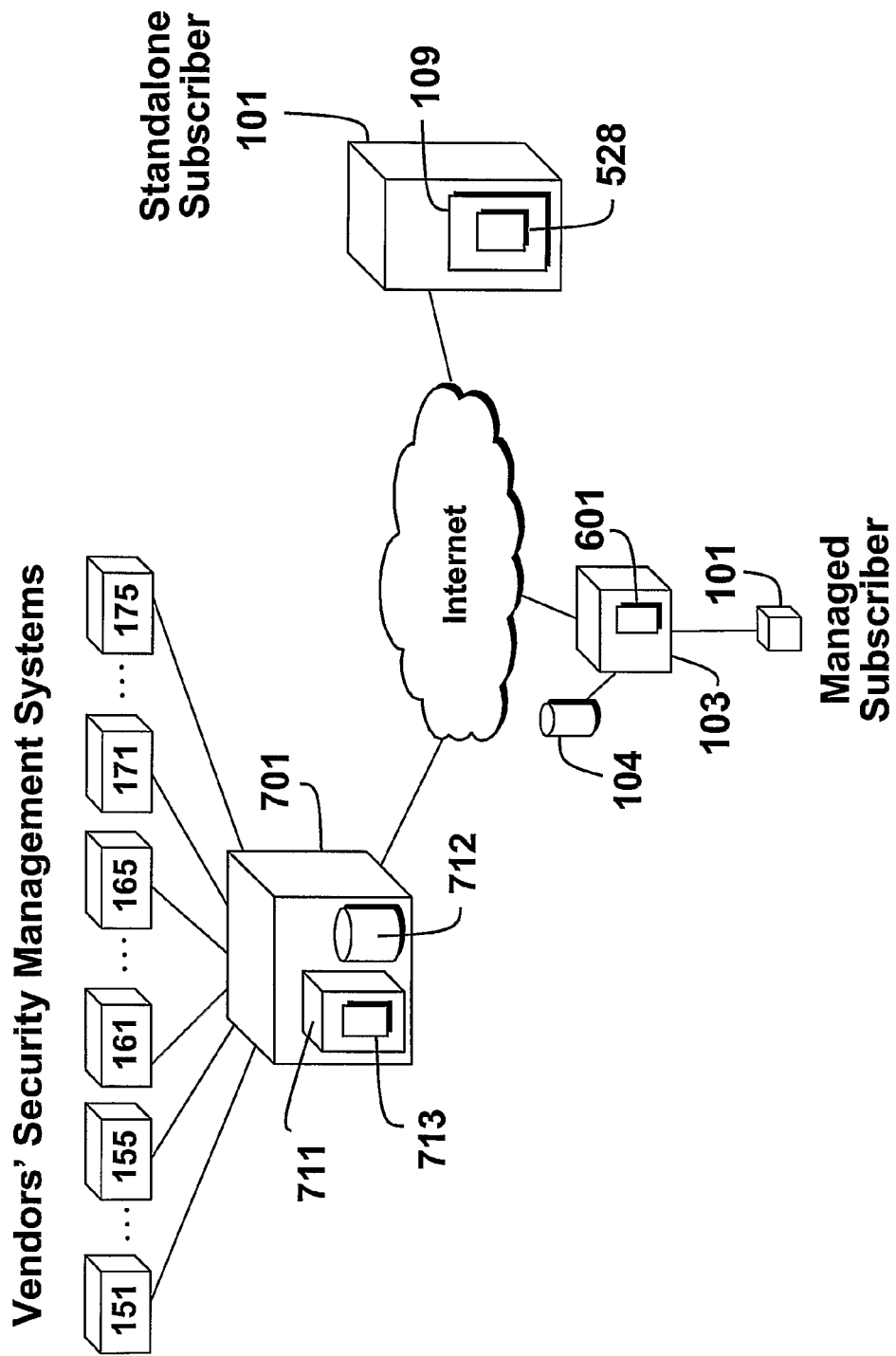
FIG. 7B is a schematic diagram as in FIG. 7A, with more details.
Figure 8:
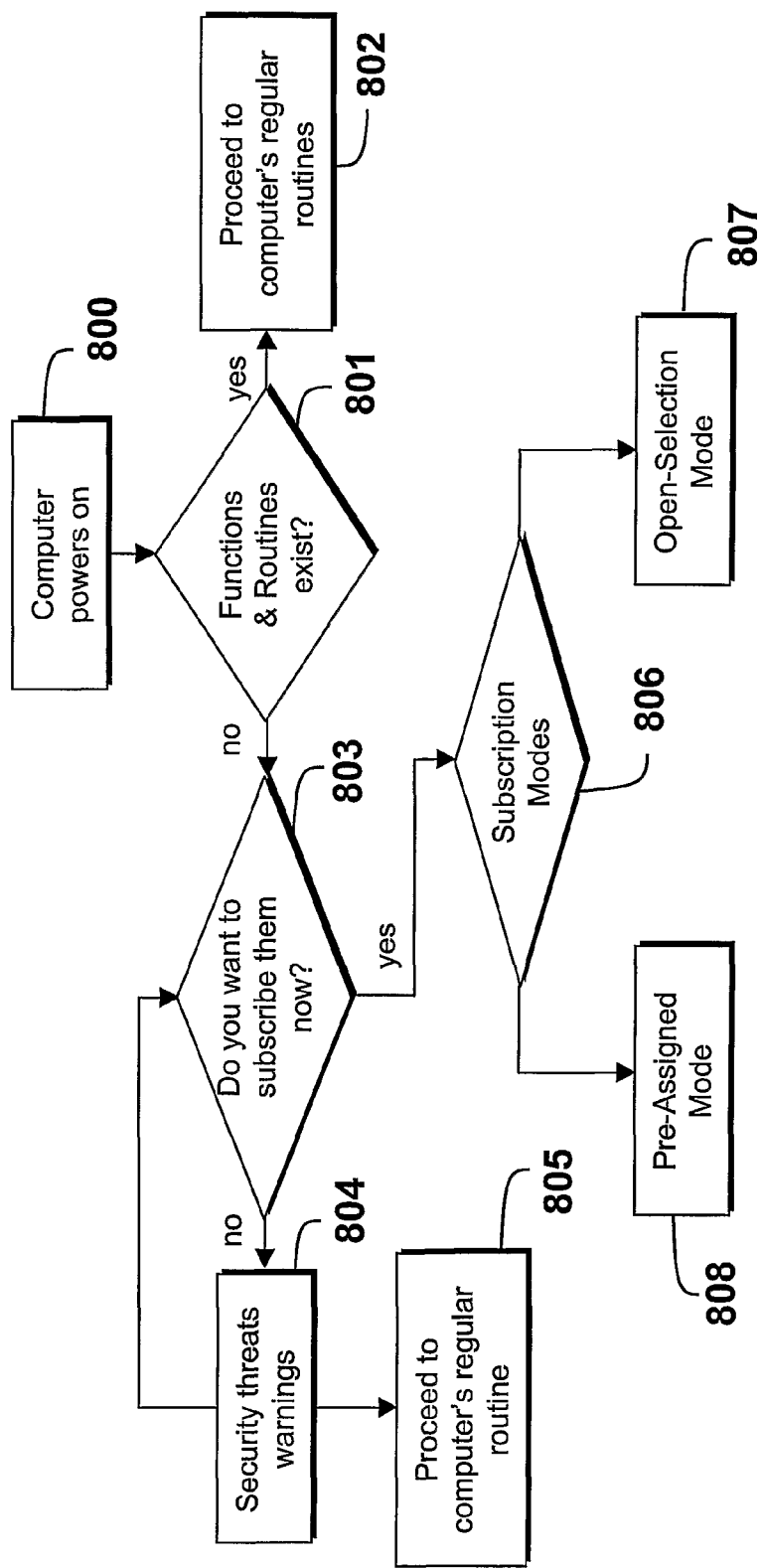
FIG. 8 is a flowchart of a method according to an embodiment of the invention.

In a representative embodiment of the methods to be further described here, a SUB 101, Unified Agent Manager 601, and resources of a 701 site may be used to support unified subscription and billing process steps. We now explain an embodiment as shown in FIGS. 7 and 8. The details of the procedures may differ for standalone users and managed users.

FIG. 8 is a flowchart describing an embodiment of a unified subscription and billing procedure for standalone users. When an endpoint is powered on (block 800), SUB 101 may check whether a security status is acceptable, for example whether certain defense and/or immunization functions exist (block 801). If so, then the endpoint proceeds to its regular functions (block 802). Otherwise, SUB 101 may prompt the user to subscribe or decline suggested defense and/or immunization functions (block 803). If a user's answer is "no", then a warning of potential security threats (block 804) may be displayed or otherwise conveyed to the user, and the endpoint may proceed to its regular functions (block 805). Otherwise, the decision flow may go to selection of subscription modes (block 806). Two exemplary subscription modes are described here: open-selection mode (block 807) and pre-assigned mode (block 808).

An open-selection mode example for standalone users is described in the following. Referring to FIG. 7B, the Subscription and Billing Management sub-Agent (SBA) 528 of Unified Agent 109 in a SUB 101 may first set up a secure connection to a Subscription and Billing Server (SBS) 711 and Database 712 at a Billing and Vendor Info Repository Center 701. Then SBA 528 may initiate a download of participating vendor's product and pricing information from SBS 711 and Database 712. SBA 528 may then guide the user to make selections for defense and/or immunization functions and inform the Subscription and Billing Coordinator (SBC) 713, an entity within SBS 711, of the selection results, and also may act to initiate and ensure completion of a single billing payment process. SBC 713 may then set up a secure connection to each selected vendor to download defense function product or products and relay them to Repository and Execution Unit (REU) 108 via SBA 528 until selected products are fully downloaded. SBA 528 may then start and complete any provisioning tasks. SBA 528 may also activate defense functions in Repository and Execution Unit 108 and selected sub-agents in Unified Agent 109 for corresponding immunization functions, inform SBC 713 of completion of the subscription and billing procedure, and tear down the connection with SBC 713. SBC 713 also may tear down connection(s) with vendor(s).

In a pre-assigned mode (block 808 in FIG. 8) case, at least one or more vendors typically will have been previously assigned, and assignment information, including vendor and product identification data as well as any other useful data, may be stored in SUB 101. In other aspects, its function may be similar to the previously described example for the open-selection mode (block 807 in FIG. 8).

In a managed environment, as shown in FIG. 7B, an example of a subscription and billing procedure for managed users is described in the following.

A system administrator of the managed users specifies a configuration of defense and immunization functions for each managed SUB 101 and stores such specification information in a database that may reside in UAM 601 or Database System 104. UAM 601 may set up a secure connection to SBS 711 and Database 712 at Repository Center 701. UAM 601 may download participating vendors' product and pricing information from SBS 711 and Database 712. UAM 601 may guide the administrator in making product selections, coordinate with SBC 713 for downloads, and initiate and confirm completion of a single billing payment process. SBC 713 may set up a secure connection to each selected vendor to download one or more defense products and store them in Database System 104 via UAM 601 until selected software modules are fully downloaded. Over a secure connection, UAM 601 may push desired software modules to each managed SUB 101 through SBA 528 according to administrator configuration data stored in a database residing in UAM 601 or Database System 104. SBA 528 may start and complete any provisioning tasks, activate defense functions in Repository and Execution Unit 108 and sub-agents in Unified Agent 109 for the selected immunization functions, and inform UAM 601 of completion of activation, after which it may tear down connection.

Thus a set of apparatus and methods for a security system are provided. One skilled in the art will appreciate that the present invention can be practiced by other than the described embodiments, which are presented for purposes of illustration and not limitation, and the present invention is limited only by the claims that follow.

What is claimed is:

1. An apparatus associated with an endpoint and configurable between a network and a host of the endpoint,
comprising computational resources, the computational resources at least comprising one processor, wherein
the computational resources are not accessible by the host, are accessible over a secure connection by a management server, and are configured to provide an open platform able to execute security function software modules from multiple vendors and provide immunization and defense functionality to protect the host.

2. The apparatus of claim 1 wherein the computational resources comprise: receiving, holding, and executing means for the security function software modules; and agent means for supporting at least the immunization functionality.

3. The apparatus of claim 2 wherein the agent means comprise unified agent means comprising a plurality of sub-agents, traffic distributor functionality, data collection functionality, and action enforcer functionality.

4. The apparatus of claim 1 wherein the endpoint comprises one of a desktop PC, a laptop or other PC, a workstation, a PDA, a cell phone, a smartphone, a set-top box.

5. A security subsystem configurable between a network and a host of an endpoint, the security subsystem comprising computing resources for providing: at least a plurality of immunization agent functions for
providing immunization protection of the host; and an open platform for receiving and executing security function software modules from multiple vendors for providing at least defense functions for protection of the host.

6. The security subsystem of claim 5 wherein at least a subset of the plurality of immunization agent functions are provided using a unified agent.

7. The security subsystem of claim 6 wherein the unified agent comprises: a plurality of sub-agents, a traffic distributor, a data collector, an action enforcer, and a control and management plane.

8. The security subsystem of claim 5 wherein the endpoint comprises one of a desktop PC, a laptop or other PC, a workstation, a PDA, a cell phone, a smartphone, a set-top box.

9. A computer system comprising a security subsystem and a host system, wherein the subsystem is connected between a network connection path and a bus of the host system; comprises a processor and additional computational resources, the processor executing at least a security-hardened operating system;
provides immunization and defense functions to protect at least the host system; is configured for access to resources of the host system and for preventing access from the host system to resources of the security subsystem;

is configured for management access by a management server system over a secure connection;

and is configurable with security function software modules from multiple vendors.

10. The computer system of claim 9 wherein the processor and additional computational resources are configured to support a plurality of the following functions for supporting security functionality:

enabling control of the security subsystem and access to selected resources of the security system by an authenticated management entity over a secure channel; providing unified agent means comprising a plurality of sub-agents;

providing open platform functionality; providing network interface functionality for providing at least one of wireline and wireless network interface functions, where the network is an Ethernet, ATM, or wireless network, with connections to a private or public network; providing data stream inspection and treatment, to facilitate examination of at least incoming traffic, and facilitate selective treatment of the traffic based on at least one security function;

process traffic such that selected portions of incoming traffic are terminated at an isolator comprising "proxy" means, such that if selected portions of the incoming traffic pertain to predefined endpoint security management actions, the isolator routes the selected portions or representative signals to a unified agent for further processing; and providing control and management plane functionality.

11. A security subsystem configurable between a network and a host of an endpoint, the security subsystem providing at least a plurality of immunization functions for immunization protection of the host; and comprising a processor and at least one of: a coprocessor, DSP, acceleration circuitry, reconfigurable circuitry, interface circuitry, data storage; and wherein the processor executes at least an operating system.

12. The security subsystem of claim 11 wherein the immunization functions are provided using a unified agent.

13. The security subsystem of claim 12 wherein the unified agent comprises a plurality of sub-agents, a traffic distributor, data collector, an action enforcer, and a control and management plane.

14. A security subsystem configurable between a network and a host of an endpoint, the security subsystem comprising computing resources for providing:

an open platform for receiving and executing security function software modules from multiple vendors for providing defense functions for protection of the host.

15. The security subsystem of claim 14 further comprising computing resources for providing immunization agent functionality for protection of the host.

16. A security subsystem configurable in the path of communications between a network and a host system of a network endpoint, the security subsystem comprising processing resources at least for providing security for the host system, in part by executing security function software modules, wherein the processing means comprises at least:

holding and executing in hardware means for at least one defense function software module for providing at least one defense function; and agent means for providing at least one immunization function.

17. The security subsystem of claim 16 wherein the processing resources further comprises means for enabling control of the security subsystem and access to selected resources of the security system by an authenticated management entity over a secure channel.

18. The security subsystem of claim 16 wherein the processing resources further provide support for multiple security function software modules from multiple vendors for providing multiple security functions as an open platform.

19. The security subsystem of claim 16 wherein the security subsystem is configured in or otherwise attached to the endpoint so as to provide direct access to computing resources of the host system via a bus or other means, while being configured to prevent access by the host system to resources of the security subsystem.

20. The subsystem of claim 16 wherein the processing resources further comprises means for processing traffic such that selected portions of incoming traffic are terminated at an isolator further comprising "proxy" means, such that: if the selected portions of the incoming traffic pertain to predefined endpoint security management actions, the isolator routes the selected portions or representative signals to a unified agent for further processing.

21. A security subsystem comprising a processor and additional computational resources and associated with a network endpoint, wherein the security subsystem:

is configurable in the path of communications between a network and a host system of the endpoint; is configurable to provide immunization and defense functionality for protecting the endpoint; is configurable either in or attached at the endpoint for communications via a bus of the host system for access to resources of the host system, so as to prevent access to resources of the security subsystem by the host system; is configurable for management access by a remote server over a secure connection; and is configurable with security function software modules from multiple vendors.

22. A system for managing and providing security for at least one endpoint, the system comprising:

at least one security subsystem associated with each at least one endpoint, each of the at least one security subsystems capable of being configured between a connecting network and a host of the respective endpoint;

and a server configured for communications with a database system and each of the at least one security subsystems;

wherein each of the at least one security subsystems comprises at least a processor and operates to form an open platform capable of holding and executing multiple security software modules for providing multiple security functions.

23. The system of claim 22 wherein the multiple security function software modules comprise at least one immunization function agent.

24. The system of claim 22 wherein at least a subset of the multiple security function software modules are from multiple vendors.

25. The system of claim 22 further providing a management zone wherein the security subsystem is maintained and defense and immunization functions are provided without interfering with end-user processing.

26. The system of claim 22 wherein each of the at least one security subsystems further comprises a unified agent for supporting vendors' security management systems for multiple immunization functions.

27. The system of claim 22 wherein the server carries out, via a control and management plane of each of the at least one security subsystems, at least one of provisioning, monitoring, and providing a control signal for at least one of the multiple security function software modules operating in each of the at least one security subsystems.

28. The system of claim 22, wherein the server comprises a unified interface converter configured for converting between vendor communications formats and a format used by the server, for communications with at least one vendors security management system.

29. The system of claim 22 wherein the server comprises at least one operator console, the console connected directly or over connecting networks to the unified interface converter.

30. A security system for forming a management zone for at least one endpoint, the system comprising:
    an open platform processor-based security subsystem at each of the at least one endpoints; a server in communications with a database system;
    wherein: each security subsystem is configured for communications with the server, and the management zone is characterized in that the server is configured to manage each security subsystem within the zone, so as to eliminate direct access by vendor security management systems.

31. The security system of claim 30 wherein the server is configured for providing at least one security function software module to each security subsystem, without direct access by a vendor security management system to the endpoint.

32. The security system of claim 30 wherein the server is configured to proxy for at least one immunization function by terminating and selectively proxying for vendor security management system communications, avoiding need for direct access into the zone by vendor security management systems.

33. A method by a network-connected management entity of providing security function software modules to a network endpoint, comprising the steps of:
    downloading security function software modules from at least one security function vendor; storing the software modules in a database system; and selecting and distributing at least one of the software modules, into a security subsystem of the endpoint, the security subsystem comprising:
    memory and a processor running an operating system and configured as an open platform for storing and executing security function software modules of multiple security function vendors.

34. The method of claim 33 wherein the management entity is a server for managing the provisioning of security function software modules for a plurality of security subsystems.

35. The method of claim 33 further comprising the step of causing the security subsystem to receive information originating from a billing and vendor information repository center, for making the information available to an endpoint user.

36. The method of claim 33 wherein the database system is used to store at least one of endpoint information, auditing and forensic data, and defense function software modules, patches, and updates, through the coordination of a server.

37. The method of claim 33 wherein the security management systems fetch information from an endpoint or deposit data to an endpoint via the database system without directly accessing the endpoint.

38. The method of claim 33 wherein the database system serves one or multiple zones, each zone corresponding to at least one management entity.

* * * * *